US012591159B2

(12) United States Patent (10) Patent No.: US 12,591,159 B2
Huang et al. (45) Date of Patent: Mar. 31, 2026

(54) TRANSPARENT DISPLAY APPARATUS

(71) Applicant: AUO Corporation, Hsinchu City (TW)

(72) Inventors: Liang-Yin Huang, Hsinchu City (TW);
Kun-Cheng Tien, Hsinchu City (TW)

(73) Assignee: AUO Corporation, Hsinchu City (TW)

( * ) Notice: Subject to any disclaimer, the term of this
patent is extended or adjusted under 35
U.S.C. 154(b) by 0 days.

(21) Appl. No.: 18/912,573

(22) Filed: Oct. 10, 2024

(65) Prior Publication Data

US 2025/0155759 A1 May 15, 2025

(30) Foreign Application Priority Data

Nov. 9, 2023 (TW) .................................. 112143281

(51) Int. Cl.
G02F 1/1362 (2006.01)
G02F 1/137 (2006.01)
G02F 1/1514 (2019.01)
(52) U.S. Cl.
CPC .. G02F 1/136286 (2013.01); G02F 1/136209
(2013.01); G02F 1/13718 (2013.01); **G02F
1/1514** (2019.01)
(58) Field of Classification Search
CPC ............. G02F 1/136286; G02F 1/1514; G02F
1/136209
See application file for complete search history.

(56) References Cited

U.S. PATENT DOCUMENTS

| | | | |
|---|---|---|---|
| 5,757,127 A | 5/1998 | Inoguchi et al. | |
| 6,744,549 B2* | 6/2004 | Vincent ................... | G02F 1/155 |
| | | | 359/268 |
| 7,463,399 B2 | 12/2008 | Shin et al. | |
| 8,994,902 B2 | 3/2015 | Kim et al. | |
| 10,209,406 B2 | 2/2019 | Ji et al. | |
| 11,194,214 B2 | 12/2021 | Larry et al. | |
| 11,275,286 B2 | 3/2022 | Larry et al. | |

(Continued)

FOREIGN PATENT DOCUMENTS

| | | |
|---|---|---|
| CN | 108231826 | 6/2018 |
| CN | 110850621 | 2/2020 |

(Continued)

*Primary Examiner* — Lucy P Chien
(74) *Attorney, Agent, or Firm* — JCIPRNET

(57) ABSTRACT

A transparent display apparatus includes a first transparent
substrate, first signal lines, second signal lines, pixel struc-
tures, transparent insulation patterns, a second transparent
substrate and an electrochromic material. The first transpar-
ent substrate has a circuit area, pixel areas and light modu-
lation areas. The first signal lines and the second signal lines
cross with each other and are arranged in the circuit area.
The pixel structures are respectively arranged in the pixel
areas and are electrically connected to the first signal lines
and the second signal lines. Each of the light modulation
areas is surrounded by a part of the pixel structures. The
transparent insulation patterns are disposed on the first
transparent substrate and cover the pixel structures respec-
tively. The second transparent substrate is disposed opposite
to the first transparent substrate. The transparent insulation
patterns and the electrochromic material are disposed
between the first transparent substrate and the second trans-
parent substrate.

19 Claims, 14 Drawing Sheets

(56) References Cited

U.S. PATENT DOCUMENTS

| | | | |
|---|---|---|---|
| 2013/0127374 A1 | 5/2013 | Lin et al. | |
| 2014/0320945 A1 | 10/2014 | Chen | |
| 2017/0212398 A1 | 7/2017 | Cao et al. | |
| 2018/0180772 A1 | 6/2018 | Ji et al. | |
| 2019/0035773 A1 | 1/2019 | Lo et al. | |
| 2019/0361310 A1 | 11/2019 | Kim et al. | |
| 2020/0292904 A1 | 9/2020 | Larry et al. | |
| 2020/0292905 A1 | 9/2020 | Larry et al. | |
| 2023/0044641 A1 * | 2/2023 | Peng ................. | G02F 1/136286 |

FOREIGN PATENT DOCUMENTS

| | | |
|---|---|---|
| CN | 111696451 | 9/2020 |
| CN | 211878375 | 11/2020 |
| CN | 112859405 | 5/2021 |
| CN | 114114745 | 3/2022 |
| CN | 114519962 | 5/2022 |
| JP | 5151022 B2 * | 2/2013 |
| TW | I447486 | 8/2014 |
| TW | 201441724 | 11/2014 |
| TW | 201911620 | 3/2019 |
| WO | 2017012297 | 1/2017 |

* cited by examiner

10B

10C

TRANSPARENT DISPLAY APPARATUS

CROSS-REFERENCE TO RELATED APPLICATION

This application claims the priority benefit of Taiwan application serial no. 112143281, filed on Nov. 9, 2023. The entirety of the above-mentioned patent application is hereby incorporated by reference herein and made a part of this specification.

BACKGROUND

Technical Field

The disclosure relates to a display apparatus, and in particular to a transparent display apparatus.

Description of Related Art

A transparent display apparatus refers to a display apparatus that can provide a transparent display state for users to view the scene behind it. It is commonly found in shop windows, vending machines, etc. The transparent display apparatus has a display area and a transparent area, wherein the display area can provide a display image for the user to view, and the transparent area can be transparent so that the user can view the rear scene. A pixel structure is provided in the display area to emit a light beam toward the display surface of the transparent display apparatus to provide a display image. However, while the transparent display apparatus displays the image, the external environment light beam will pass through the transparent display apparatus, affecting the contrast of the display image of the transparent display apparatus.

SUMMARY

The disclosure provides a variety of transparent display apparatus with good performance.

A transparent display apparatus according to an embodiment of the disclosure includes a first transparent substrate, first signal lines, second signal lines, pixel structures, transparent insulation patterns, a second transparent substrate and an electrochromic material. The first transparent substrate has a circuit area, pixel areas and light modulation areas. The first signal lines and the second signal lines cross each other and are disposed in the circuit area. The pixel structures are respectively disposed in the pixel areas, and are electrically connected to the first signal lines and the second signal lines. Each of the light modulation areas is surrounded by a part of the pixel structures. The transparent insulation patterns are disposed on the first transparent substrate and cover the pixel structures respectively. The second transparent substrate is disposed opposite to the first transparent substrate. The transparent insulation patterns and the electrochromic material are disposed between the first transparent substrate and the second transparent substrate.

A transparent display apparatus according to another embodiment of the disclosure includes a first transparent display panel, a light modulation panel and a first optical adhesive layer. The light modulation panel includes a first transparent substrate, a first electrode, a second transparent substrate, a second electrode and an electrochromic material. The first electrode is disposed on the first transparent substrate. The second transparent substrate is disposed opposite to the first transparent substrate. The second electrode is disposed on the second transparent substrate. The electrochromic material is disposed between the first electrode and the second electrode. The first optical adhesive layer is disposed between the first transparent display panel and the light modulation panel, wherein the first optical adhesive layer has dye molecules.

A transparent display apparatus according to another embodiment of the disclosure includes a first transparent display panel, a light modulation panel and a second transparent display panel. The light modulation panel includes a first transparent substrate, a first electrode, a second transparent substrate, a second electrode and an electrochromic material. The first electrode is disposed on the first transparent substrate. The second transparent substrate is disposed opposite to the first transparent substrate. The second electrode is disposed on the second transparent substrate. The electrochromic material is disposed between the first electrode and the second electrode. The light modulation panel is disposed between the first transparent display panel and the second transparent display panel. The first electrode of the light modulation panel has a first light-shielding conductive portion, and the first light-shielding conductive portion overlaps a light emitting element of the first transparent display panel and a light emitting element of the second transparent display panel.

A transparent display apparatus according to yet another embodiment of the disclosure includes a first transparent display panel, a light modulation panel and a cholesterol liquid crystal layer. The light modulation panel includes a first transparent substrate, a first electrode disposed on the first transparent substrate, a second transparent substrate disposed opposite the first transparent substrate, a second electrode disposed on the second transparent substrate, and an electrochromic material disposed between the first electrode and the second electrode. The cholesterol liquid crystal layer is disposed between the first transparent display panel and the light modulation panel. The first transparent display panel has a pixel area and a light modulation area next to the pixel area. The first transparent display panel includes a first transparent substrate, a second transparent substrate, at least one light emitting element and at least one photoluminescent pattern. The first transparent substrate of the first transparent display panel is closer to the cholesterol liquid crystal layer than the second transparent substrate of the first transparent display panel. At least one light emitting element is located in the pixel area and is disposed on the first transparent substrate of the first transparent display panel. The at least one photoluminescent pattern is located in the light modulation area and is disposed on the second transparent substrate of the first transparent display panel.

DESCRIPTION OF THE EMBODIMENTS

Figure 1:
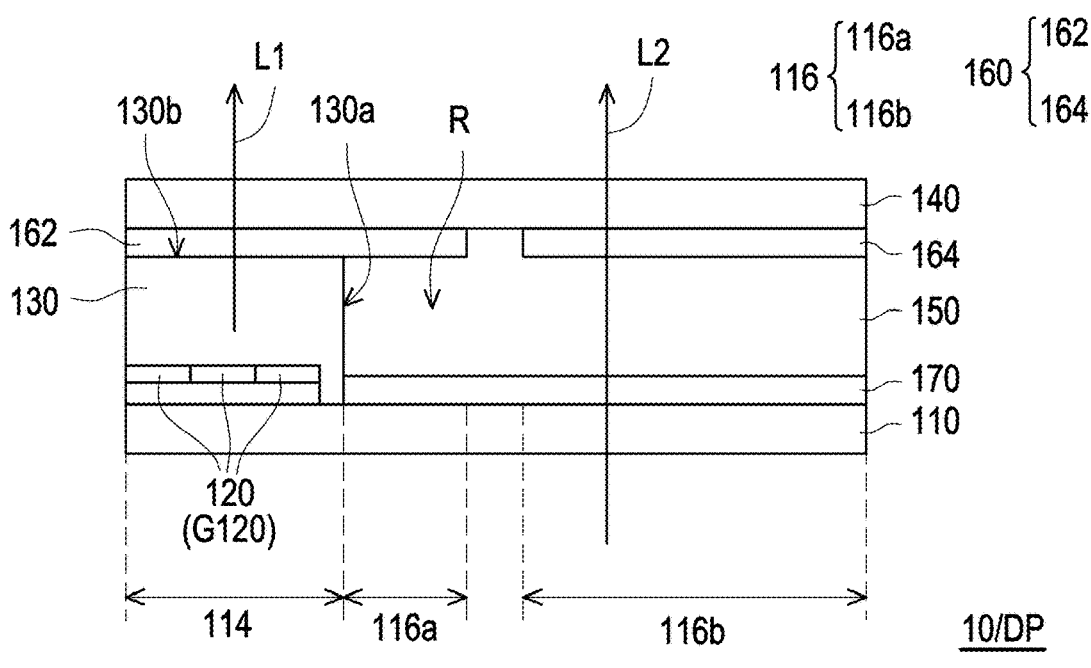
FIG. 1 is a schematic cross-sectional view of a transparent display apparatus according to an embodiment of the present disclosure.

Reference will now be made in detail to exemplary embodiments provided in the disclosure, examples of which are illustrated in accompanying drawings. Wherever possible, identical reference numerals are used in the drawings and descriptions to refer to identical or similar parts.

It should be understood that when a device such as a layer, film, region or substrate is referred to as being "on" or "connected to" another device, it may be directly on or connected to another device, or intervening devices may also be present. In contrast, when a device is referred to as being "directly on" or "directly connected to" another device, there are no intervening devices present. As used herein, the term "connected" may refer to physical connection and/or electrical connection. Besides, if two devices are "electrically connected" or "coupled", it is possible that other devices are present between these two devices.

The term "about," "approximately," or "substantially" as used herein is inclusive of the stated value and a mean within an acceptable range of deviation for the particular value as determined by people having ordinary skill in the art, considering the measurement in question and the error associated with measurement of the particular quantity (i.e., the limitations of the measurement system). For example, "about" may mean within one or more standard deviations, for example, ±30%, ±20%, ±10%, or ±5% of the stated value. Moreover, a relatively acceptable range of deviation or standard deviation may be chosen for the term "about," "approximately," or "substantially" as used herein based on optical properties, etching properties or other properties, instead of applying one standard deviation across all the properties.

Unless otherwise defined, all terms (including technical and scientific terms) used herein have the same meaning as commonly understood by people of ordinary skill in the art. It will be further understood that terms, such as those defined in the commonly used dictionaries, should be interpreted as having a meaning that is consistent with their meaning in the context of the relevant art and the invention and will not be interpreted in an idealized or overly formal sense unless expressly so defined herein.

Figure 2:
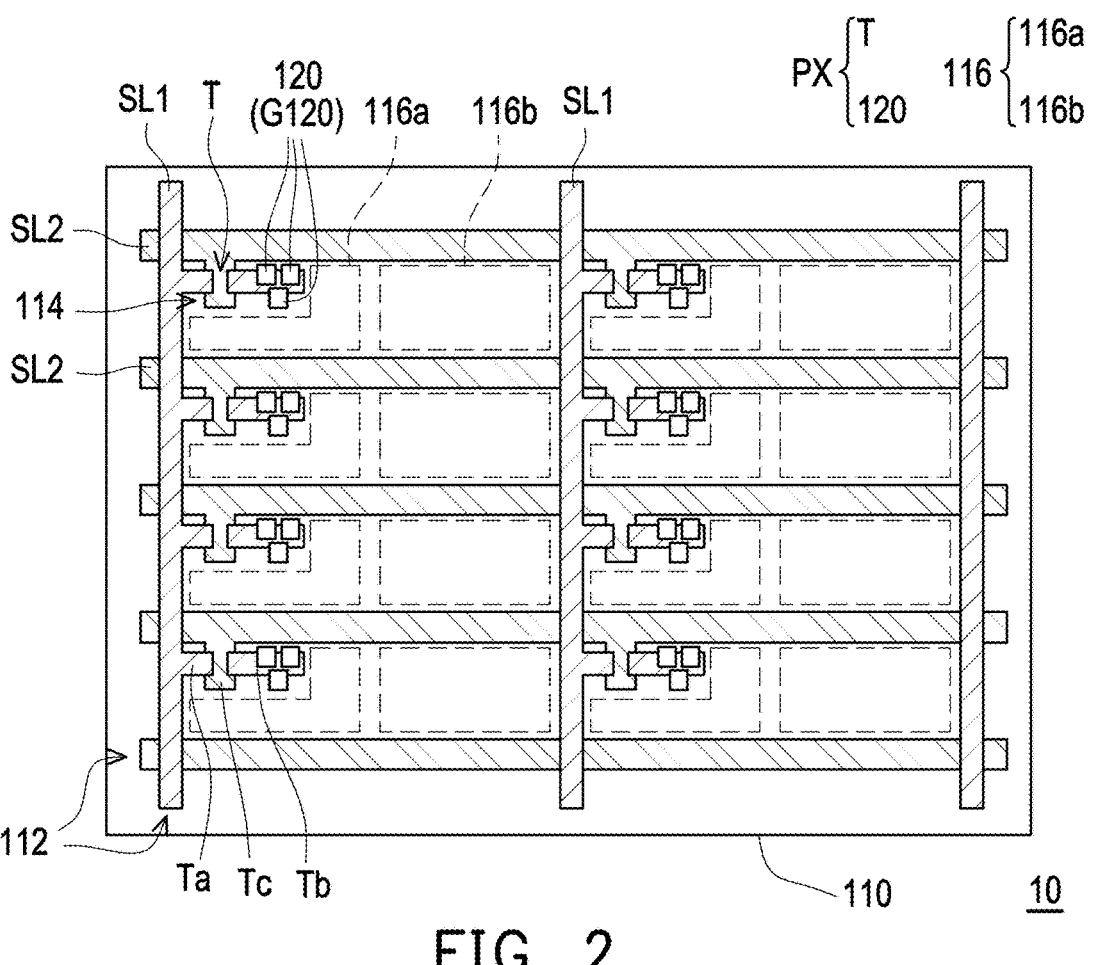
FIG. 2 is a schematic top view of a transparent display apparatus according to an embodiment of the present disclosure.
Figure 3:
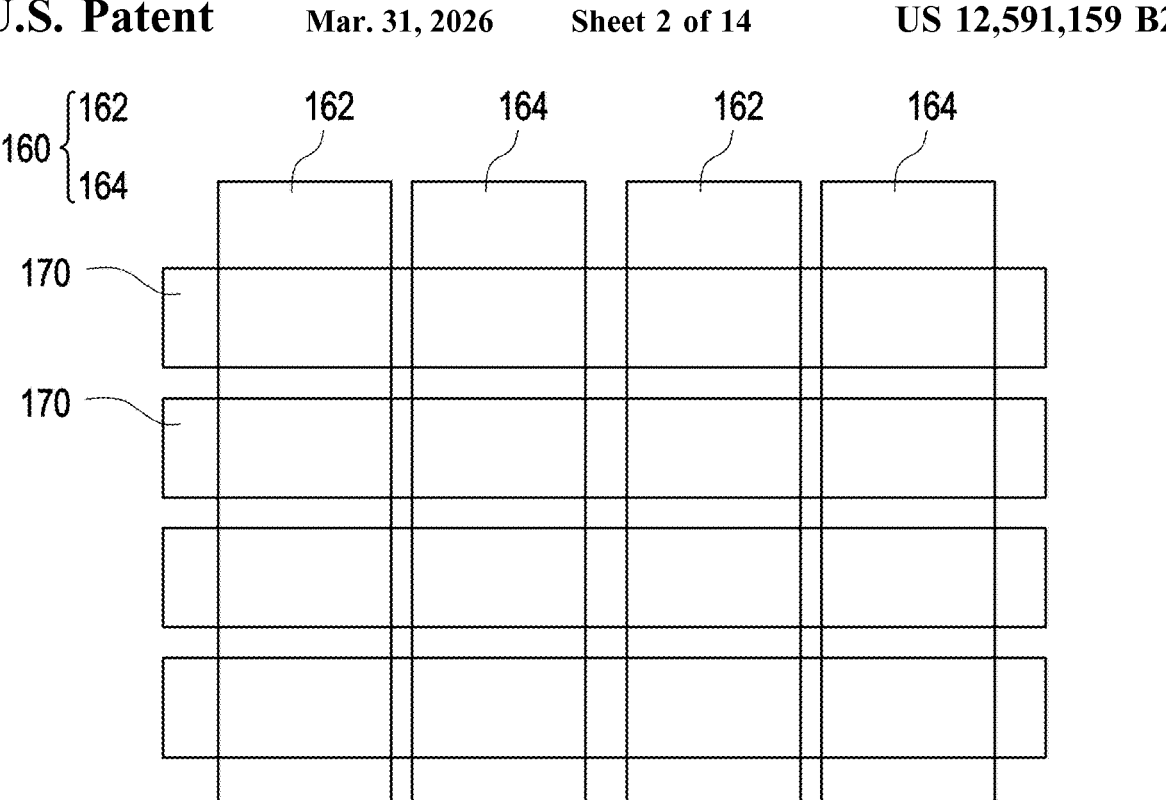
FIG. 3 is a schematic top view of the first transparent electrode and the second transparent electrode of the transparent display apparatus according to an embodiment of the present disclosure.

FIG. 1 is a schematic cross-sectional view of a transparent display apparatus according to an embodiment of the present disclosure. FIG. 2 is a schematic top view of a transparent display apparatus according to an embodiment of the present disclosure. FIG. 2 shows the first transparent substrate 110, the first signal line SL1, the second signal line SL2 and the pixel structure PX, while other components are omitted. FIG. 3 is a schematic top view of the first transparent electrode and the second transparent electrode of the transparent display apparatus according to an embodiment of the present disclosure.

Referring to FIG. 1 and FIG. 2, a transparent display apparatus 10 includes a first transparent substrate 110, first signal lines SL1, second signal lines SL2 and pixel structures PX. The first transparent substrate 110 has a circuit area 112, pixel areas 114 and light modulation areas 116. The first signal lines SL1 and the second signal lines SL2 intersect with each other and are disposed in the circuit area 112. The pixel structures PX are respectively disposed in the pixel areas 114 and are electrically connected to the first signal lines SL1 and the second signal lines SL2. Each of the light modulation area 116 is surrounded by a part of the pixel structures PX.

In one embodiment, the first signal lines SL1 and the second signal lines SL2 intersect with each other to form a mesh-like light-tight structure, and the circuit area 112 may include an area occupied by the mesh-like light-tight structure. For example, in one embodiment, the first signal lines SL1 and the second signal lines SL2 may include data lines and scan lines respectively, but this disclosure is not limited to thereto.

In one embodiment, each of the pixel structures PX may be disposed at an intersection of a corresponding first signal line SL1 and a corresponding second signal line SL2 and/or in an area near the intersection. In an embodiment, each of the pixel structure PX may include a thin film transistor T and light emitting elements 120, wherein a first terminal Ta and a control terminal Tc of the thin film transistor T are electrically connected to the corresponding first signal line SL1. and the corresponding second signal line SL2, respectively, and the second terminal Tb of the thin film transistor T is electrically connected to the light emitting elements 120. For example, in one embodiment, the light emitting elements 120 of each of the pixel structure PX may include light emitting diode elements respectively used to emit first color light, second color light and third color light, the first color light, the second color light and the third color light are, for example, red light, green light and blue light, but this disclosure is not limited thereto.

In an embodiment, each of the light modulation area 116 may be an area surrounded by two adjacent first signal lines SL1 and two adjacent second signal lines SL2 and not occupied by the pixel structure PX. In one embodiment, according to the usage mode of the transparent display apparatus 10, each of the light modulation area 116 can be adjusted to be transparent, opaque, or partially transparent and partially opaque.

The transparent display apparatus 10 further includes transparent insulation patterns 130 disposed on the first transparent substrate 110 and respectively cover the pixel structures PX. Specifically, in one embodiment, each of the transparent insulation pattern 130 may cover light emitting elements 120 of a corresponding pixel structure PX, and the light emitting elements 120 of each of the pixel structure PX form a light emitting element group G120, the transparent insulation patterns 130 may be island-shaped transparent structures respectively overlapping the light emitting element groups G120, but this disclosure is not limited to thereto.

The transparent display apparatus 10 further includes a second transparent substrate 140 and an electrochromic material 150. The second transparent substrate 140 is disposed opposite to the first transparent substrate 110. The transparent insulation patterns 130 and the electrochromic material 150 are disposed between the first transparent substrate 110 and the second transparent substrate 140. The light emitting elements 120, the transparent insulation patterns 130 and the electrochromic material 150 are disposed in a single unit cell formed by the first transparent substrate 110 and the second transparent substrate 140. In one embodiment, the side wall 130a of the transparent insulation pattern 130 may be in contact with the electrochromic material 150. In one embodiment, the transparent insulation pattern 130 may occupy a space above the light emitting element group G120 in the unit cell, and the top surface 130b of the transparent insulation pattern 130 may not be in contact with the electrochromic material 150.

Referring to FIG. 1, FIG. 2 and FIG. 3, in one embodiment, the transparent display apparatus 10 further includes first transparent electrodes 160 and second transparent electrodes 170. The first transparent electrodes 160 are disposed on the second transparent substrate 140. The second transparent electrodes 170 are disposed on the first transparent substrate 110. The first transparent electrodes 160 and the second transparent electrodes 170 intersect with each other on the light modulation areas 116. A part of the electrochromic material 150 on each of the light modulation areas 116 can be controlled by the first transparent electrode 160 and the second transparent electrode 170 intersected with each other. When there is sufficient current between the first transparent electrode 160 and the second transparent electrode 170 intersected with each other, a part of the electrochromic material 150 on the light modulation area 116 undergoes an electrochemical oxidation-reduction reaction, and is in a dimming state. When there is essentially no potential difference between the first transparent electrode 160 and the second transparent electrode 170 intersected with each other, a part of the electrochromic material 150 on the light modulation area 116 is in a translucent state.

For example, in one embodiment, one of the first transparent electrodes 160 and the second transparent electrodes 170 (eg, the first transparent electrodes 160) may include a first light modulation electrode 162 and a first light modulation electrode 162 that are structurally separated from each other. The light modulation area 116 includes a first light modulation area 116a and a second light modulation area 116b overlapping the first light modulation electrode 162 and the second light modulation electrode 164 respectively. In an embodiment, in the top view of the transparent display apparatus 10, the pixel structure PX is located between two adjacent first signal lines SL1 and between two adjacent second signal lines SL2, the first light modulation electrode 162 and the second light modulation electrode 164 are located between the two adjacent first signal lines SL1, and the first light modulation electrode 162 is closer to the pixel structure PX than the second light modulation electrode 164; in the top view of the transparent display apparatus 10, at least one (for example: at least one second transparent electrode 170) of another of the first transparent electrodes 160 and the second transparent electrodes 170 (for example: the second transparent electrodes 170) is disposed between two adjacent second signal lines SL2. However, this disclosure is not limited to thereto. In other embodiments, the first transparent electrode 160 and the second transparent electrode 170 may be configured in other ways.

FIG. 1 and FIG. 2 illustrate the transparent display apparatus 10 in a general transparent display mode. Referring to FIG. 1, FIG. 2 and FIG. 3, when the transparent display apparatus 10 is in the general transparent display mode, the pixel structures PX are turned on (ie, the light emitting elements 120 emit light beams) to provide light beams L1, the light beams L1 pass through the transparent insulation patterns 130 and the second transparent substrate 140 to form a display image, there is essentially no potential difference between the first transparent electrodes 160 and the second transparent electrodes 170, and at least one portion of the electrochromic material 150 located in the light modulation areas 116 is in a translucent state. At this time, the user can simultaneously view the display image provided by the transparent display apparatus 10 and the scene behind the transparent display apparatus 10. However, due to the influence of the ambient light beam L2, the contrast of the display image of the transparent display apparatus 10 is not high.

Figure 4:
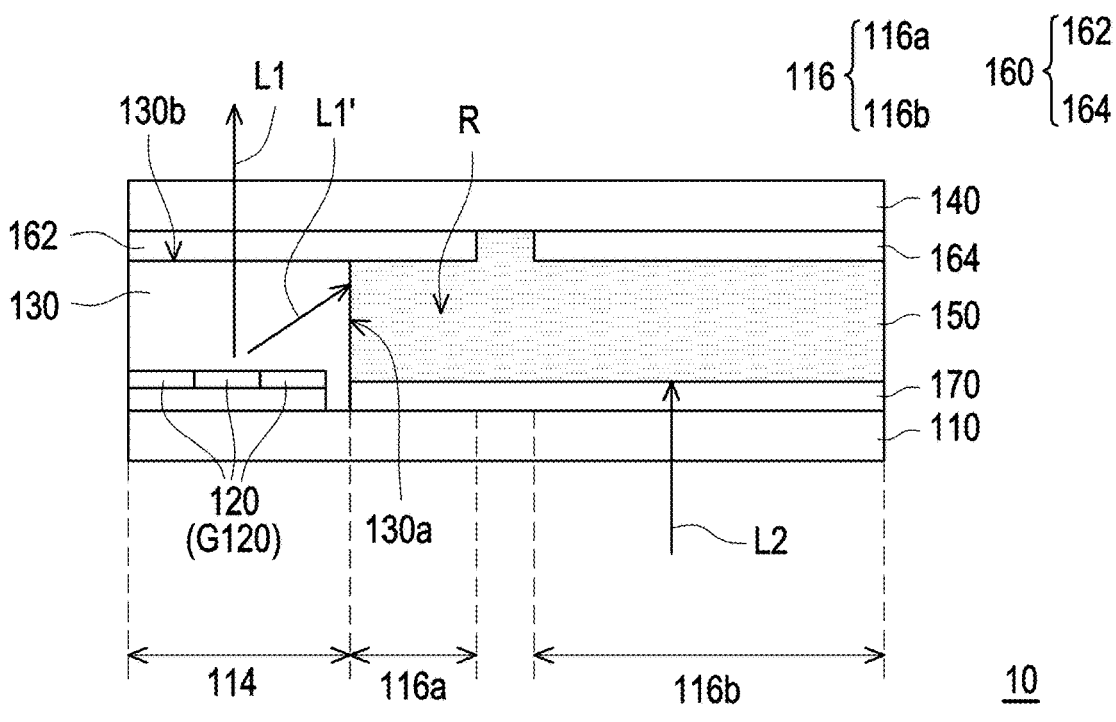
FIG. 4 is a schematic cross-sectional view of a transparent display apparatus according to an embodiment of the present disclosure.
Figures 5, 6:
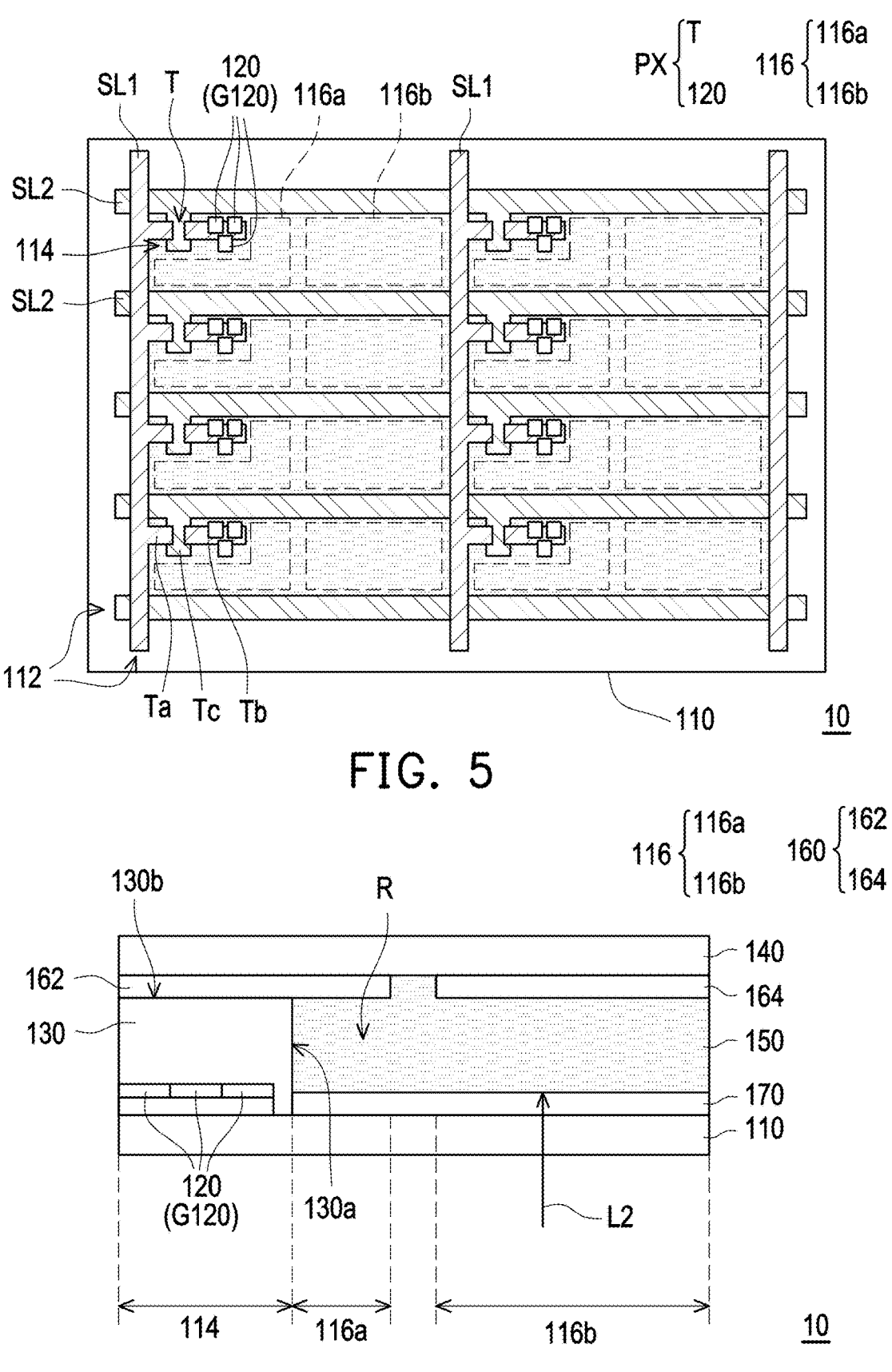
FIG. 5 is a schematic top view of a transparent display apparatus according to an embodiment of the present disclosure.
FIG. 6 is a schematic cross-sectional view of a transparent display apparatus according to an embodiment of the present disclosure.

FIG. 4 is a schematic cross-sectional view of a transparent display apparatus according to an embodiment of the present disclosure. FIG. 5 is a schematic top view of a transparent display apparatus according to an embodiment of the present disclosure. FIG. 5 shows the first transparent substrate 110, the first signal lines SL1, the second signal lines SL2 and the pixel structures PX, while other components are omitted. FIG. 4 and FIG. 5 illustrate the transparent display apparatus 10 in special display mode (or high contrast non-transparent display mode).

Referring to FIG. 3, FIG. 4 and FIG. 5, the transparent display apparatus 10 may be further switched to a special display mode so that the user can see a high-contrast display image. Specifically, when the transparent display apparatus 10 is in the high-contrast non-transparent display mode, the pixel structures PX are turned on to provide light beams L1, and the light beams L1 pass through the transparent insulation patterns 130 and the second transparent substrate 140 to form a display image, the first transparent electrodes 160 and the second transparent electrodes 170 have sufficient current, and a portion of the electrochromic material 150 located in the light modulation areas 116 is in a dimming state. At this time, the user can see the display image provided by the transparent display apparatus 10 but cannot view the rear view because all the light modulation areas 116 are in dimming state. It is worth mentioning that the ambient light beam L2 can be absorbed by the electrochromic material 150 in the dimming state located in the light modulation area 116. The interference of the ambient light beam L2 on the display image can be reduced, thereby improving the contrast of the display image. In addition, in this mode, the electrochromic material 150 located in the light modulation area 116 and in the dimming state can also absorb the light beam L1' emitted by the pixel structures PX in the direction of the wide viewing angle, thus having a privacy protection function.

FIG. 6 is a schematic cross-sectional view of a transparent display apparatus according to an embodiment of the present disclosure. The transparent display apparatus 10 of FIG. 6 is in light shielding mode. Referring to FIG. 6, when the transparent display apparatus 10 is in the light shielding mode, the pixel structures PX are turned off (that is, the light emitting element 120 does not emit light), the first transparent electrode 160 and the second transparent electrode 170 have a potential difference, at least one portion of the electrochromic material 150 located in the light modulation area 116 is in a dimming state and can absorb the ambient light beam L2. At this time, the transparent display apparatus 10 does not provide a display image but has dimming/heat insulation functions and can be used as a heat-insulating window.

Figure 7:
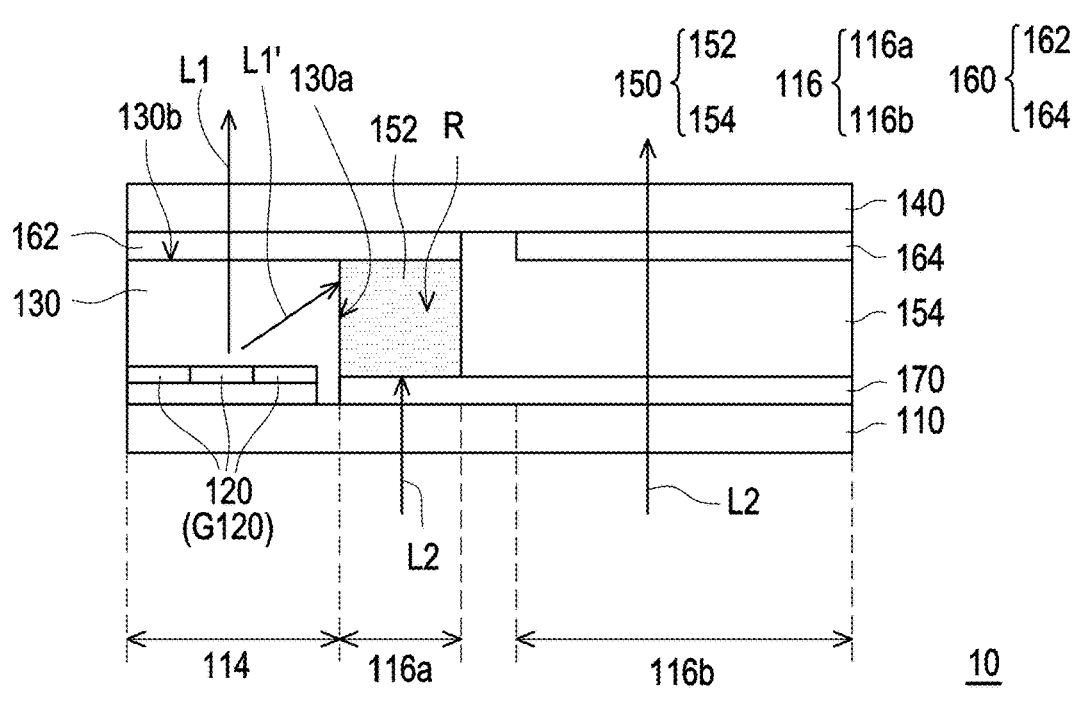
FIG. 7 is a schematic cross-sectional view of a transparent display apparatus according to an embodiment of the present disclosure.
Figure 8:
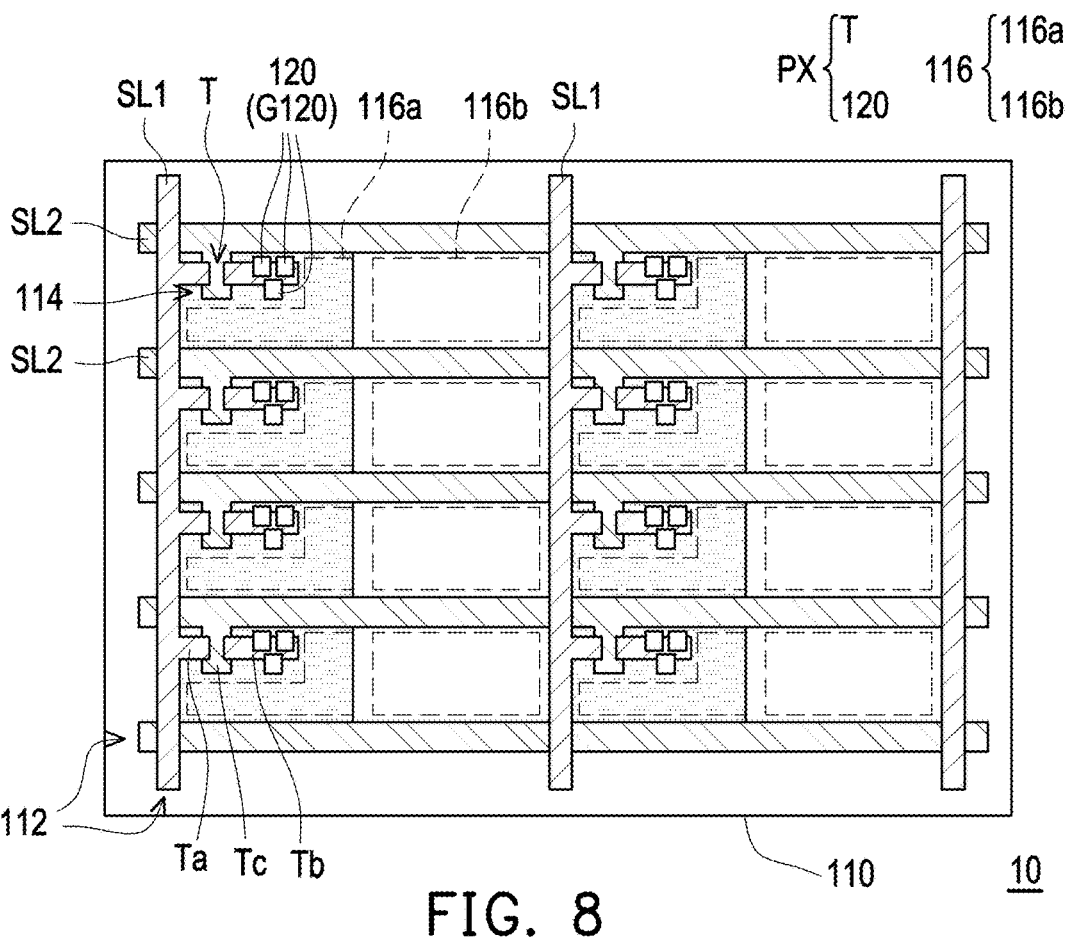
FIG. 8 is a schematic top view of a transparent display apparatus according to an embodiment of the present disclosure.

FIG. 7 is a schematic cross-sectional view of a transparent display apparatus according to an embodiment of the present disclosure. FIG. 8 is a schematic top view of a transparent display apparatus according to an embodiment of the present disclosure. FIG. 8 shows the first transparent substrate 110, the first signal lines SL1, the second signal lines SL2 and the pixel structures PX, while other components are omitted. The transparent display apparatus 10 shown in FIG. 7 and FIG. 8 is in a special transparent display mode (or high-contrast transparent display mode).

Figure 10:
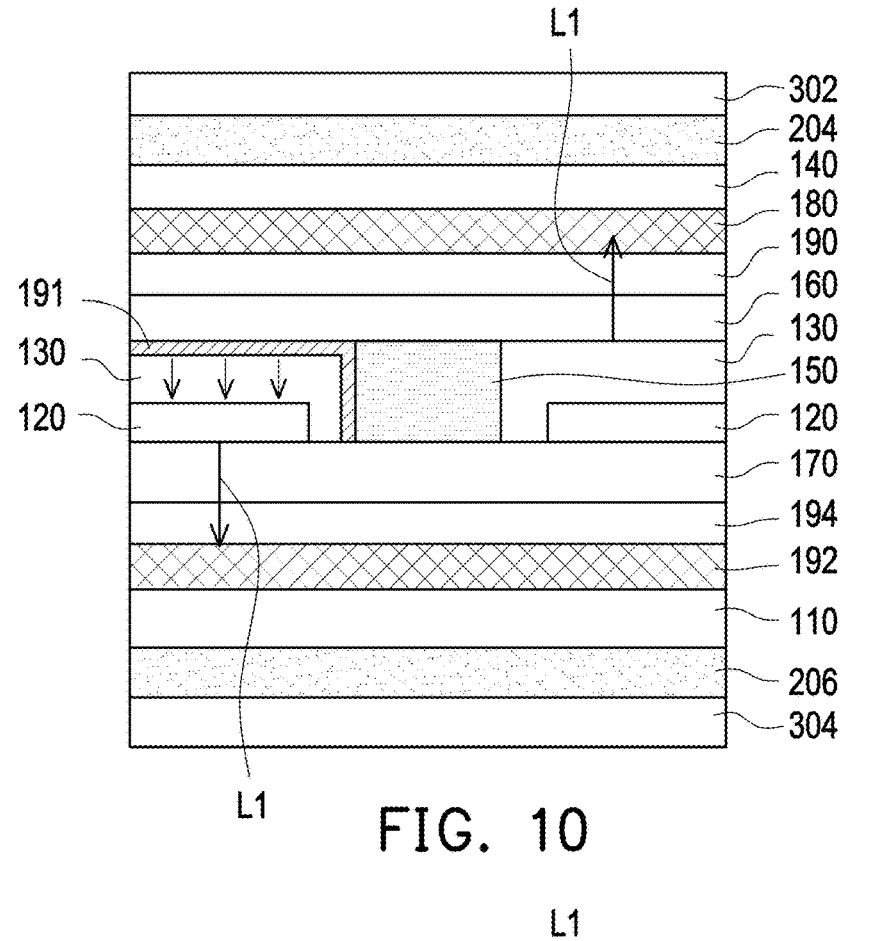
FIG. 10 is a schematic cross-sectional view of a transparent display apparatus according to yet another embodiment of the present disclosure.

Referring to FIG. 3, FIG. 7 and FIG. 10, the transparent display apparatus 10 may further be switched to a high-contrast transparent display mode, so that the user can view the high-contrast display image and the rear scene at the same time. Specifically, one of the first transparent electrodes 160 and the second transparent electrodes 170 (for example: the first transparent electrodes 160) includes a first light modulation electrode 162 and a second light modulation electrode 164 that are structurally separated from each other, when the transparent display apparatus 10 is in the high-contrast transparent display mode, the first transparent electrode 160 or the second transparent electrode 170 (for example: the second transparent electrode 170) of another of the first transparent electrodes 160 and the second transparent electrodes 170 and the first light modulation electrode 162 have sufficient current, a portion 152 of the electrochromic material 150 located in the first light modulation area 116a is in a dimming state, the first transparent electrode 160 or the second transparent electrode 170 (for example: the second transparent electrode 170) of another of the first transparent electrodes 160 and the second transparent electrodes 170 and the second light modulation electrode 164 have substantially no current, and a portion 154 of the electrochromic material 150 located in the second light modulation area 116b is in a translucent state. At this time, the user can see the display image provided by the transparent display apparatus 10 and simultaneously view the rear scene through the second light modulation area 116b in the transparent state. In particular, while viewing the rear scene, the ambient light beam L2 transmitted to the vicinity of the pixel structure PX can be absorbed by the portion 152 of the electrochromic material 150 located in the first light modulation area 116a and in the dimming state, the interference of the ambient light beam L2 on the display image can be reduced, thereby improving the contrast of the display image. In addition, in this mode, the portion 152 of the electrochromic material 150 located in the first light modulation area 116a and in the dimming state can also absorb the light beam L1' emitted by the pixel structure PX in the direction of the wide viewing angle, thereby reducing lateral light leakage.

Referring to FIGS. 1, 4, 6 and 7, the transparent display apparatus 10 may operate in a general transparent display mode, a high contrast non-transparent display mode, a light shielding mode or a high contrast transparent display mode according to user requirements. It is worth noting that the electrochromic material 150 and the pixel structure PX used to enable the transparent display apparatus 10 to operate in various modes are disposed in a single unit cell formed by the first transparent substrate 110 and the second transparent substrate 140, and the transparent display apparatus 10 has the advantage of being thinner.

Figure 9:
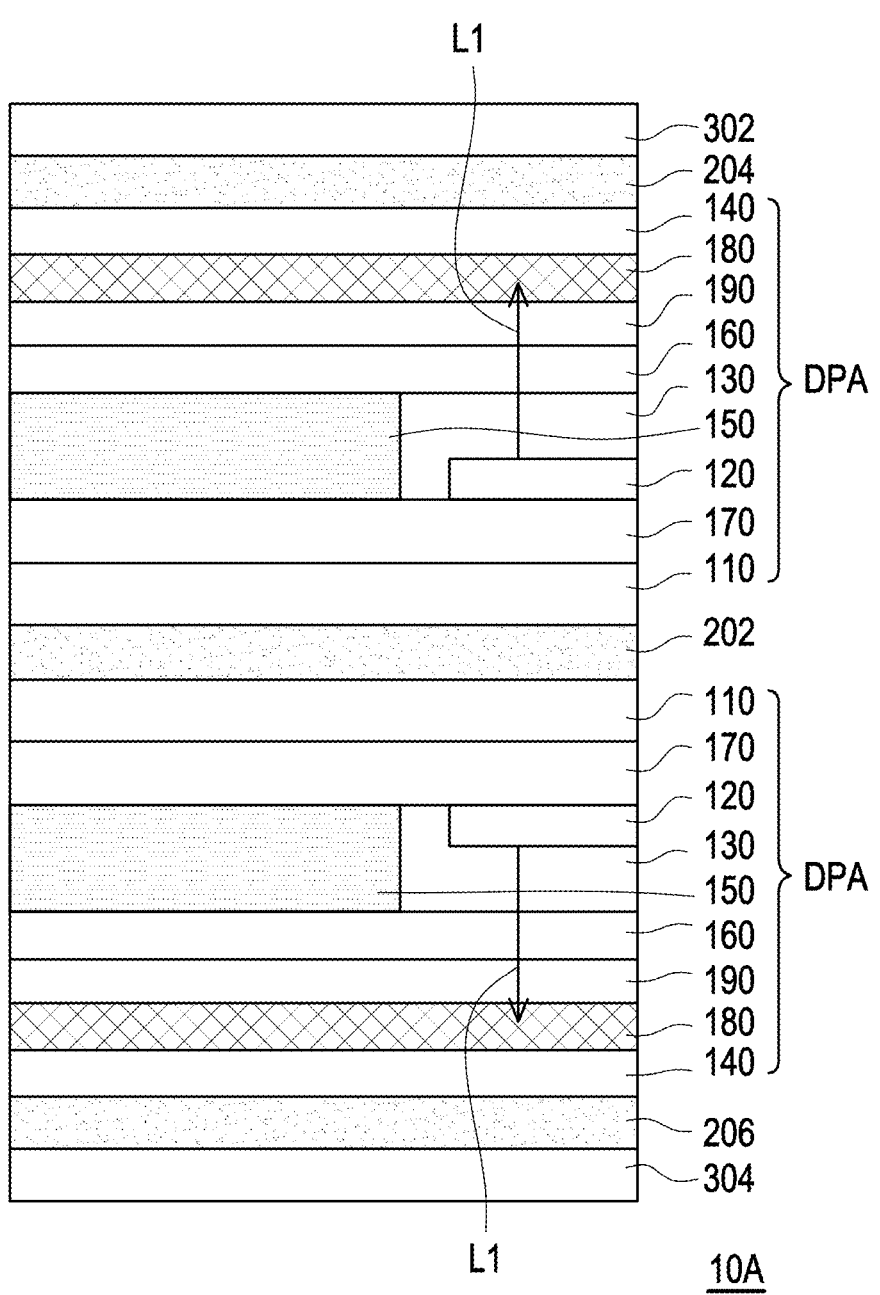
FIG. 9 is a schematic cross-sectional view of a transparent display apparatus according to another embodiment of the present disclosure.

FIG. 9 is a schematic cross-sectional view of a transparent display apparatus according to another embodiment of the present disclosure. Referring to FIGS. 1 and 9, the afore-mentioned transparent display apparatus 10 of FIG. 1 may be regarded as a transparent display panel DP, and the transparent display apparatus 10A of FIG. 9 may include two transparent display panels DPA similar to the transparent display panel DP of FIG. 1. The difference between each of the transparent display panel DPA in FIG. 9 and the transparent display panel DP in FIG. 1 is that each of the transparent display panel DPA in FIG. 9 further includes a touch sensing layer 180 disposed between the second transparent substrate 140 and the first transparent electrode 160 and an insulation layer 190 disposed between the touch sensing layer 180 and the first transparent electrode 160. Referring to FIG. 9, the transparent display apparatus 10A further includes an optical adhesive 202, two transparent display panels DPA are respectively disposed on opposite sides of the optical adhesive 202 and are attached to each other through the optical adhesive 202, the light beams L1 emitted by the light emitting elements 120 of the two transparent display panels DPA may be emitted toward the opposite sides of the optical adhesive 202 respectively, thereby forming a double-sided transparent display with a double-sided touch function. In one embodiment, the transparent display apparatus 10A may further include transparent protective covers 302 and 304, respectively disposed on second transparent substrates 140 of the transparent display panels DPA, and respectively through optical adhesives 204, 206 connected to the transparent display panels DPA.

FIG. 10 is a schematic cross-sectional view of a transparent display apparatus according to yet another embodiment of the present disclosure. Referring to FIGS. 1 and 10, the transparent display apparatus 10B in FIG. 10 is similar to the transparent display apparatus 10 in FIG. 1, the difference between the two transparent display apparatus is that the transparent display apparatus 10B in FIG. 10 further includes a touch sensing layer 180 disposed between the second transparent substrate 140 and the first transparent electrode 160, an insulation layer 190 disposed between the touch sensing layer 180 and the first transparent electrode 160, a touch sensing layer 192 disposed between the first transparent substrate 110 and the second transparent electrode 170 and an insulation layer 194 disposed between the touch sensing layer 192 and the second transparent electrode 170, and a part of the light emitting elements 120 and another part of the light emitting elements 120 of the transparent display apparatus 10B can emit light beams L1 in two opposite directions, thereby forming a double-sided transparent display with a double-sided touch function. In detail, since the light emitting element 120 has higher luminous efficiency toward the front side (ie, the upper side in FIG. 10), if all the light emitting elements 120 are disposed on a single side of the first transparent substrate 110, in the case of double-sided display, it is necessary to form a reflective layer 191 on the transparent insulation pattern 130 of a part of the light emitting element 120 (for example, the light emitting element 120 on the left side of FIG. 10), so that the part of the light emitting element 120 can emit light toward the back side (ie, the bottom of FIG. 10), thereby achieving the effect of double-sided display.

In addition, in an embodiment, the transparent display apparatus 10B may further include transparent protective covers 302 and 304, respectively disposed on the second transparent substrate 140 and the first transparent substrate 110, and respectively through an optical adhesives 204 and 206 connected to the second transparent substrate 140 and the first transparent substrate 110.

Figure 11:
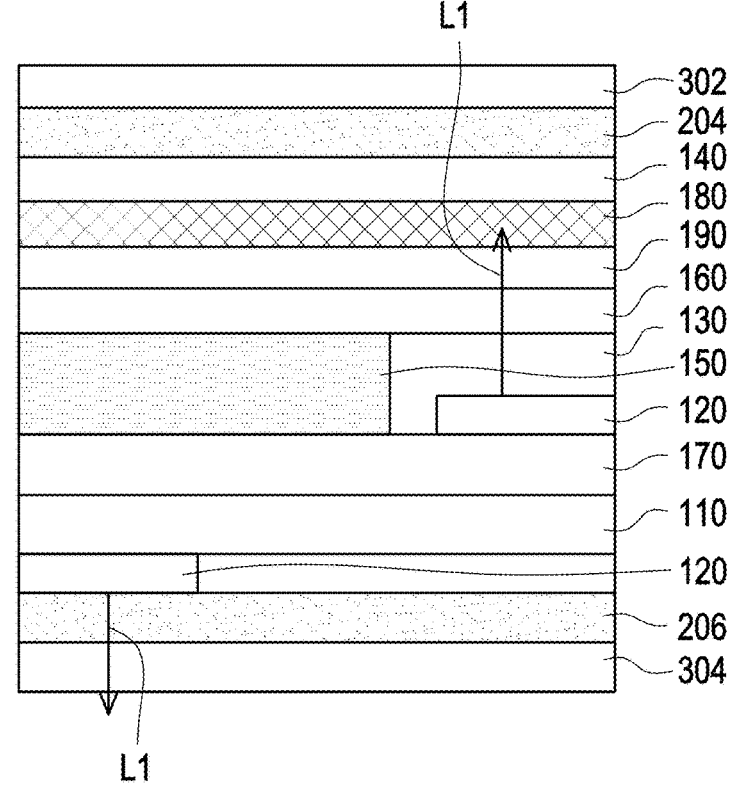
FIG. 11 is a schematic cross-sectional view of a transparent display apparatus according to yet another embodiment of the present disclosure.

FIG. 11 is a schematic cross-sectional view of a transparent display apparatus according to yet another embodiment of the present disclosure. Referring to FIGS. 10 and 11, the transparent display apparatus 10C in FIG. 11 is similar to the transparent display apparatus 10B in FIG. 10. The difference between the two transparent display apparatus is that a part of the light emitting elements 120 of the transparent display apparatus 10C and the electrochromic material 150 in FIG. 11 are disposed in a single unit cell formed by the first transparent substrate 110 and the second transparent substrate 140, and another part of the light emitting elements 120 is disposed outside the unit cell and is located between the first transparent substrate 110 and the transparent protective cover 304. In addition, the transparent display apparatus 10C in FIG. 11 may omit one of the touch sensing layers 192 of the transparent display apparatus 10B in FIG. 10.

Figure 12:
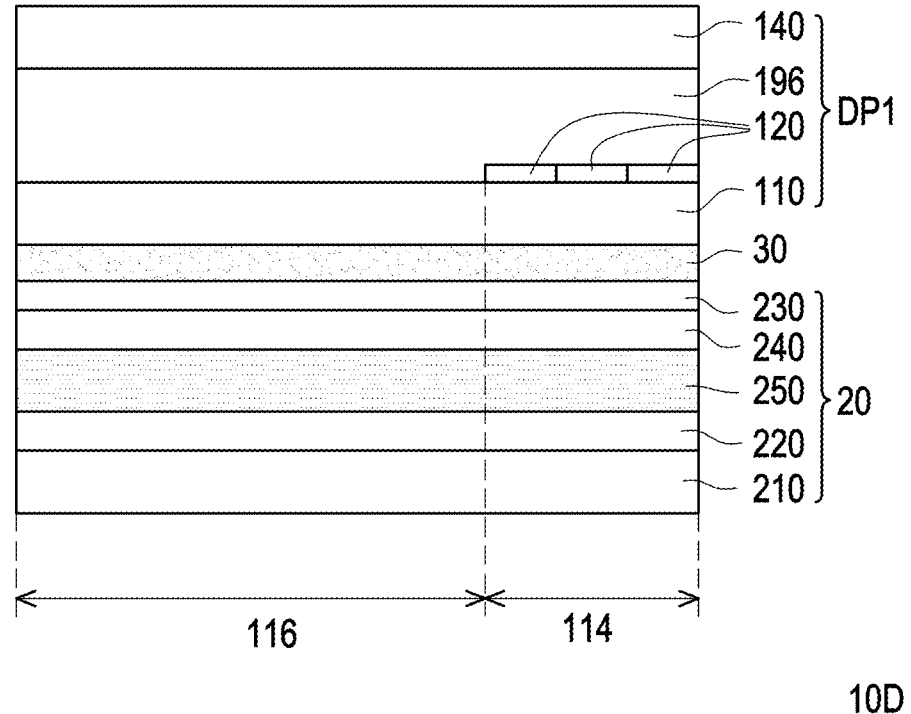
FIG. 12 is a schematic cross-sectional view of a transparent display apparatus according to an embodiment of the present disclosure.

FIG. 12 is a schematic cross-sectional view of a transparent display apparatus according to an embodiment of the present disclosure. Referring to FIG. 12, the transparent display apparatus 10D includes a first transparent display panel DP1 and a light modulation pane 120. The first transparent display panel DP1 in FIG. 12 is similar to the aforementioned transparent display panel DP in FIG. 1. The difference between the two transparent display panel is that the first transparent display panel DP1 in FIG. 12 does not include the electrochromic material 150 and the transparent insulation pattern 130 of the transparent display panel DP in FIG. 1. The first transparent display panel DP1 in FIG. 12 includes a transparent encapsulation layer 196 completely covering the first transparent substrate 110 and the light emitting elements 120.

Referring to FIG. 12, the light modulation pane 120 is disposed behind the first transparent display panel DP1. The light modulation pane 120 includes a first transparent substrate 210, a first electrode 220 disposed on the first transparent substrate 210, a second transparent substrate 230 disposed opposite the first transparent substrate 210, a second electrode 240 disposed on the second transparent substrate 230, and a electrochromic material 250 between first electrode 220 and second electrode 240. When the first transparent display panel DP1 displays an image, the first electrode 220 and the second electrode 240 of the light modulation pane 120 may have enough current to make the electrochromic material 250 assume a dimming state. In this way, the light modulation panel 20 can prevent the ambient light beam to interfere the display image of the first transparent display panel DP1, thereby improving the contrast.

It is worth noting that the transparent display apparatus 10D further includes a first optical adhesive layer 30 disposed between the first transparent display panel DP1 and the light modulation panel 20, wherein the first optical adhesive layer 30 has dye molecules. Since the first optical adhesive layer 30 has dye molecules, the first optical adhesive layer 30 can be used as a color correction layer of the electrochromic material 250 and/or the light emitting element 120. For example, in one embodiment, when the first electrode 220 and the second electrode 240 of the light modulation panel 20 have substantially no voltage difference and the electrochromic material 250 is in a translucent state, the color of the light modulation panel 20 is yellowish, and the first optical adhesive layer 30 may have blue dye molecules to correct the color shift of the light modulation panel 20, but this disclosure is not limited to thereto.

Figure 13:
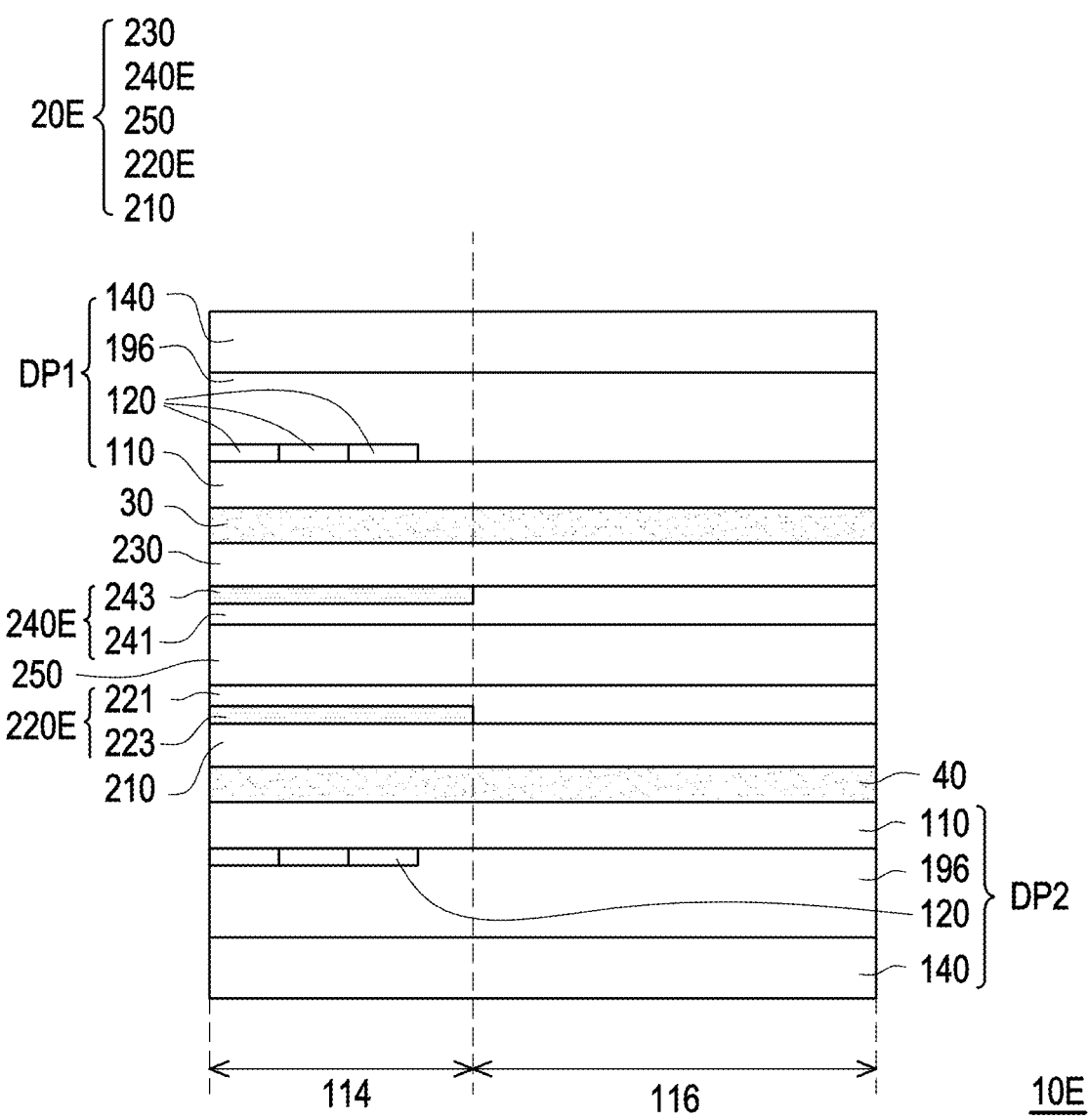
FIG. 13 is a schematic cross-sectional view of a transparent display apparatus according to another embodiment of the present disclosure.

FIG. 13 is a schematic cross-sectional view of a transparent display apparatus according to another embodiment of the present disclosure. The transparent display apparatus 10E in FIG. 13 is similar to the aforementioned transparent display apparatus 10D in FIG. 12. The difference between the two transparent display apparatus is that the transparent display apparatus 10E in FIG. 13 further includes a second transparent display panel DP2 and a second optical adhesive layer 40, and the first electrode 220E and the second electrode 240E of the modulation panel 20E in FIG. 13 are different from the first electrode 220 and second electrode 240 of the light modulation panel 20 in FIG. 12.

Referring to FIG. 13, specifically, in this embodiment, the transparent display apparatus 10E further includes a second transparent display panel DP2, wherein the light modulation panel 20E is disposed between the first transparent display panel DP1 and the second transparent display panel DP2. The first transparent display panel DP1 and the second transparent display panel DP2 in FIG. 13 have the same or similar structures as the first transparent display panel DP1 in FIG. 12, which will not be repeated here. The first transparent display panel DP1 and the second transparent display panel DP2 in FIG. 13 are used to provide the first display image and the second display image to both sides of the light modulation panel 20E respectively. When the first transparent display panel DP1 provides the first display image and/or the second transparent display panel DP2 provides the second display image, the first electrode 220E and the second electrode 240E of the light modulation panel 20E may have sufficient current to make the electrochromic material 250 appear dimming state, thereby improving the contrast of the first display image and/or the contrast of the second display image.

The transparent display apparatus 10E further includes a second optical adhesive layer 40 disposed between the light modulation panel 20E and the second transparent display panel DP2, wherein the second optical adhesive layer 40 has dye molecules. Since the second optical adhesive layer 40 has dye molecules, the second optical adhesive layer 40 can be used as a color correction layer of the electrochromic material 250 and/or the light emitting element 120 of the second transparent display panel DP2. For example, in one embodiment, when the first electrode 220E and the second electrode 240E of the light modulation panel 20E have substantially no voltage difference and the electrochromic material 250 is in a translucent state, the color of the light modulation panel 120E is yellowish, and the second optical adhesive layer 40 may have blue dye molecules to correct the color shift of the light modulation panel 20E, but this disclosure is not limited to thereto.

Figure 14:
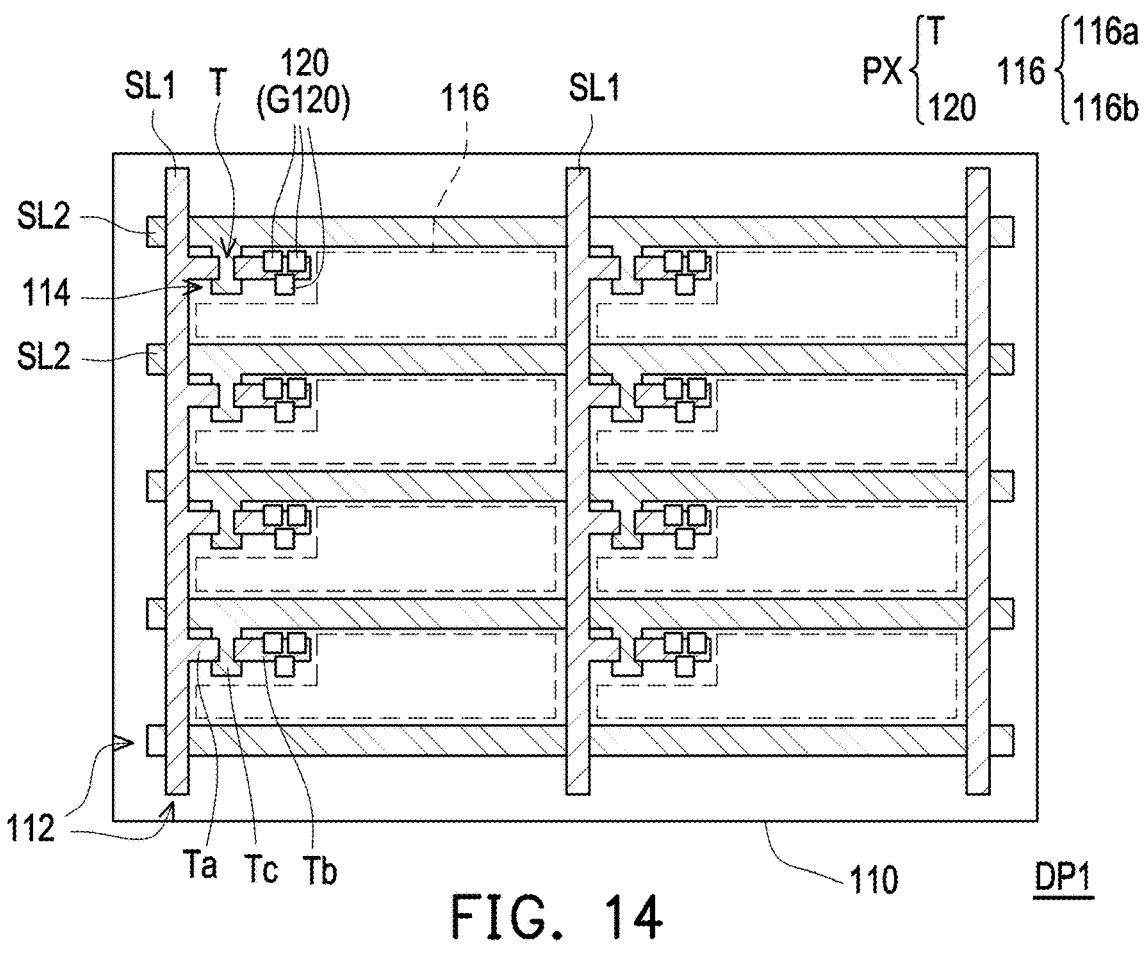
FIG. 14 is a schematic top view of the first transparent display panel of the transparent display apparatus according to another embodiment of the present disclosure.
Figure 15:
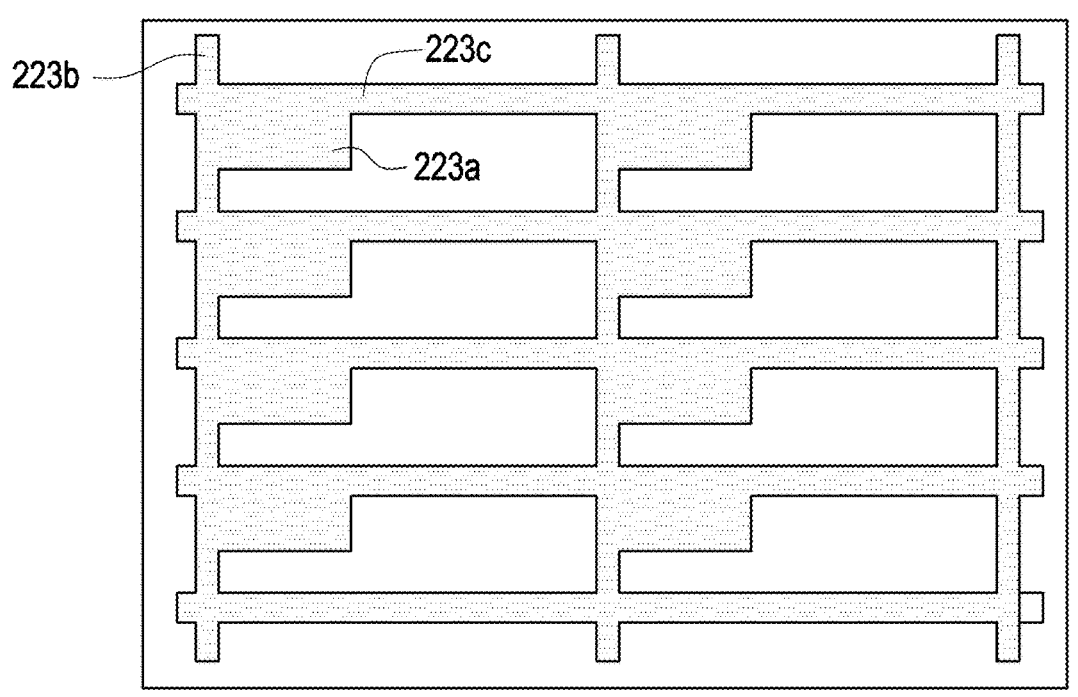
FIG. 15 is a schematic top view of the first electrode of the light modulation panel of the transparent display apparatus according to another embodiment of the present disclosure.

FIG. 14 is a schematic top view of the first transparent display panel of the transparent display apparatus according to another embodiment of the present disclosure. FIG. 14 shows the first transparent substrate 110, the first signal lines SL1, the second signal lines SL2 and the pixel structures PX, while other components are omitted. FIG. 15 is a schematic top view of the first electrode of the light modulation panel of the transparent display apparatus according to another embodiment of the present disclosure.

Referring to FIG. 13, FIG. 14 and FIG. 15, the light modulation panel 20E is disposed between the first transparent display panel DP1 and the second transparent display panel DP2. In one embodiment, the first electrode 220E of the light modulation panel 20E may have a first light-transmitting conductive portion 221 and a first light-shielding conductive portion 223, the first light-transmitting conductive portion 221 overlaps the light modulation area 116, the first light-shielding conductive portion 223 overlaps the light emitting element 120 of the first transparent display panel DP1 and the light emitting element 120 of the second transparent display panel DP2. In one embodiment, the first light-shielding conductive portion 223 may selectively include sub-light shielding conductive portions 223a, 223b, 223c, that respectively shield the pixel structure PX, the first signal line SL1 and the second signal line SL2 of the first transparent display panel DP1, but this disclosure is not limited to thereto.

Similarly, in one embodiment, the second electrode 240E of the light modulation panel 20 may have a second light-transmitting conductive portion 241 and a second light-shielding conductive portion 243, the second light-transmitting conductive portion 241 overlaps the light modulation area 116, the second light-shielding conductive portion 243 overlaps the light emitting element 120 of the first transparent display panel DP1 and the light emitting element 120 of the second transparent display panel DP2. In detail, in one embodiment, the second light-shielding conductive portion 243 may optionally include sub light shielding conductive portions (not shown) that respectively shield the light emitting element 120, the first signal line SL1 and the second signal line SL2 of the first transparent display panel DP1, but this disclosure is not limited to thereto.

The first electrode 220E and the second electrode 240E respectively having the first light-shielding conductive portion 223 and the second light-shielding conductive portion 243 can reduce the mutual interference of the first display image and the second display image respectively transmitted to the opposite sides of the light modulation pane 120E. In one embodiment, the material of the first light-shielding conductive portion 223 and the second light-shielding conductive portion 243 is, for example, blackened metal, but this disclosure is not limited to thereto.

Figure 16:
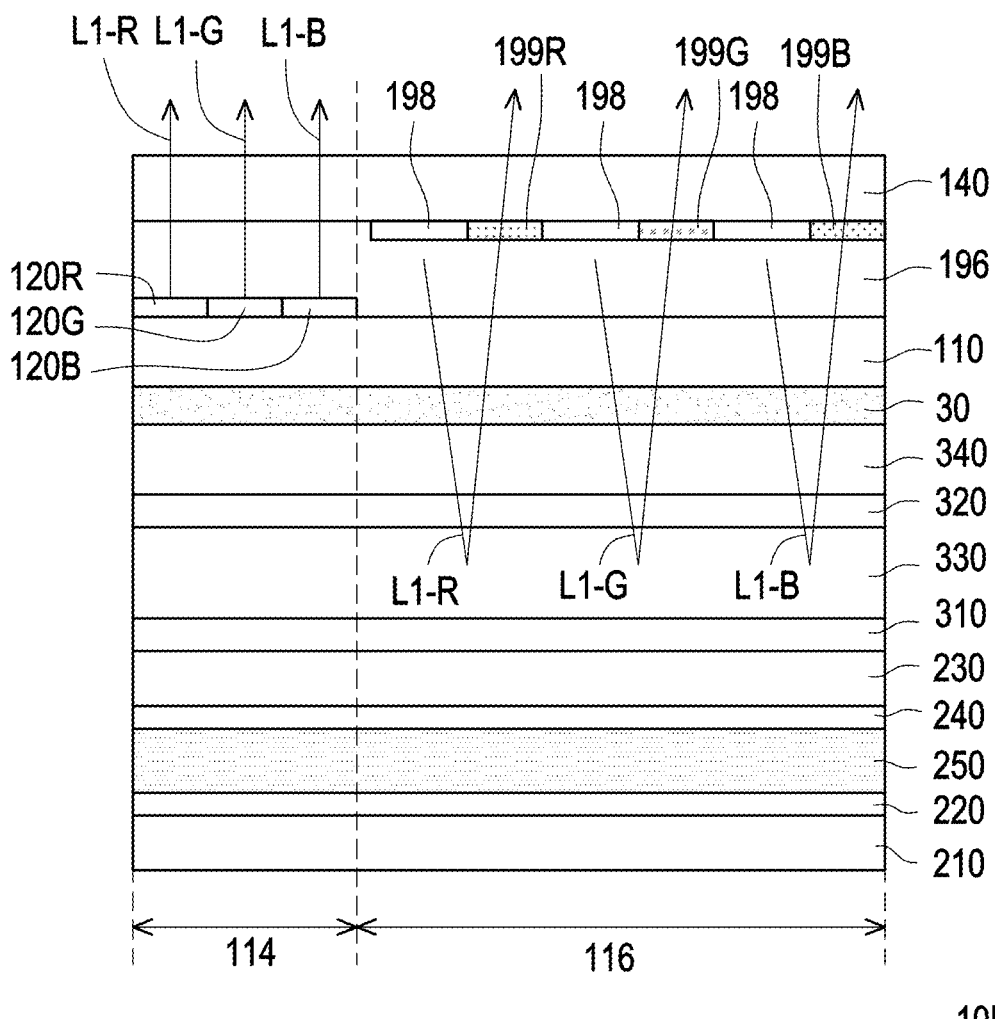
FIG. 16 is a schematic cross-sectional view of a transparent display apparatus according to another embodiment of the present disclosure.
Figure 17:
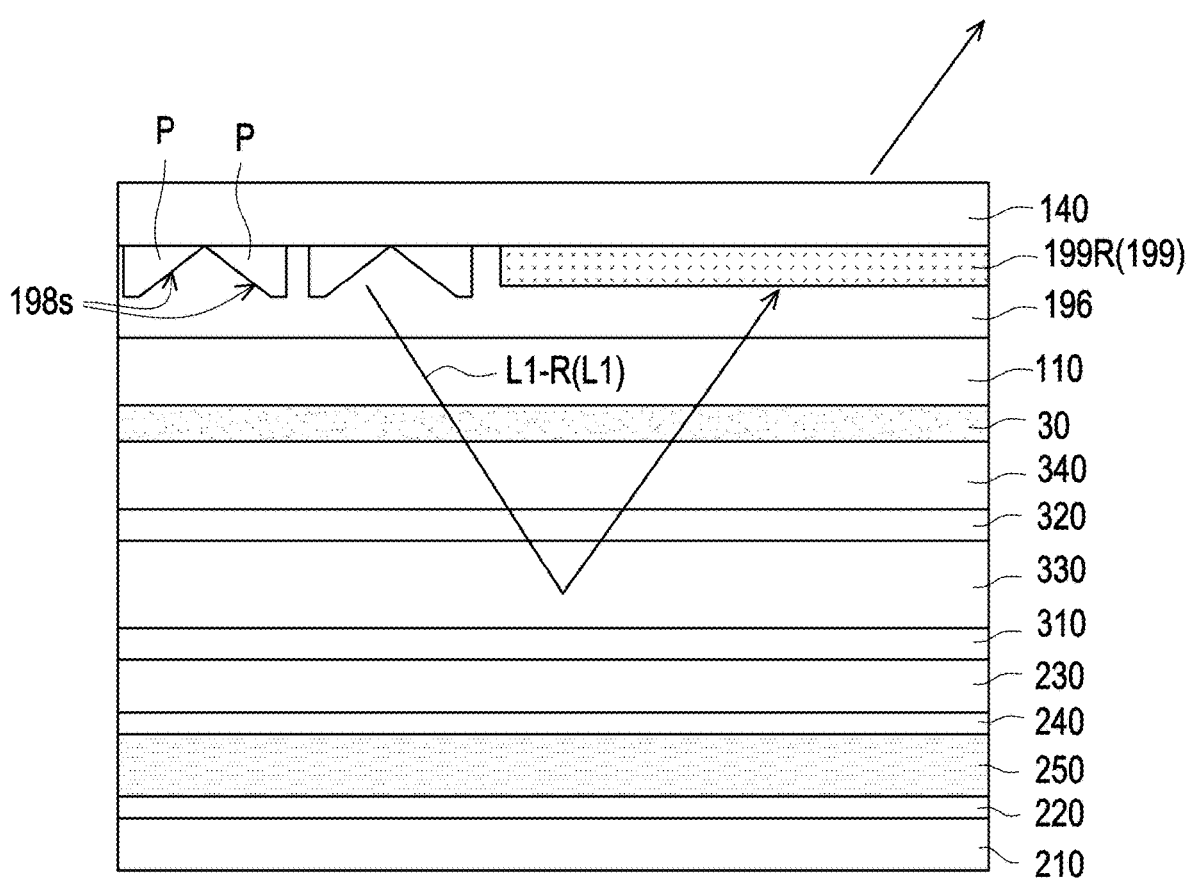
FIG. 17 is a partially enlarged schematic diagram of the transparent display apparatus of FIG. 16.
Figure 18:
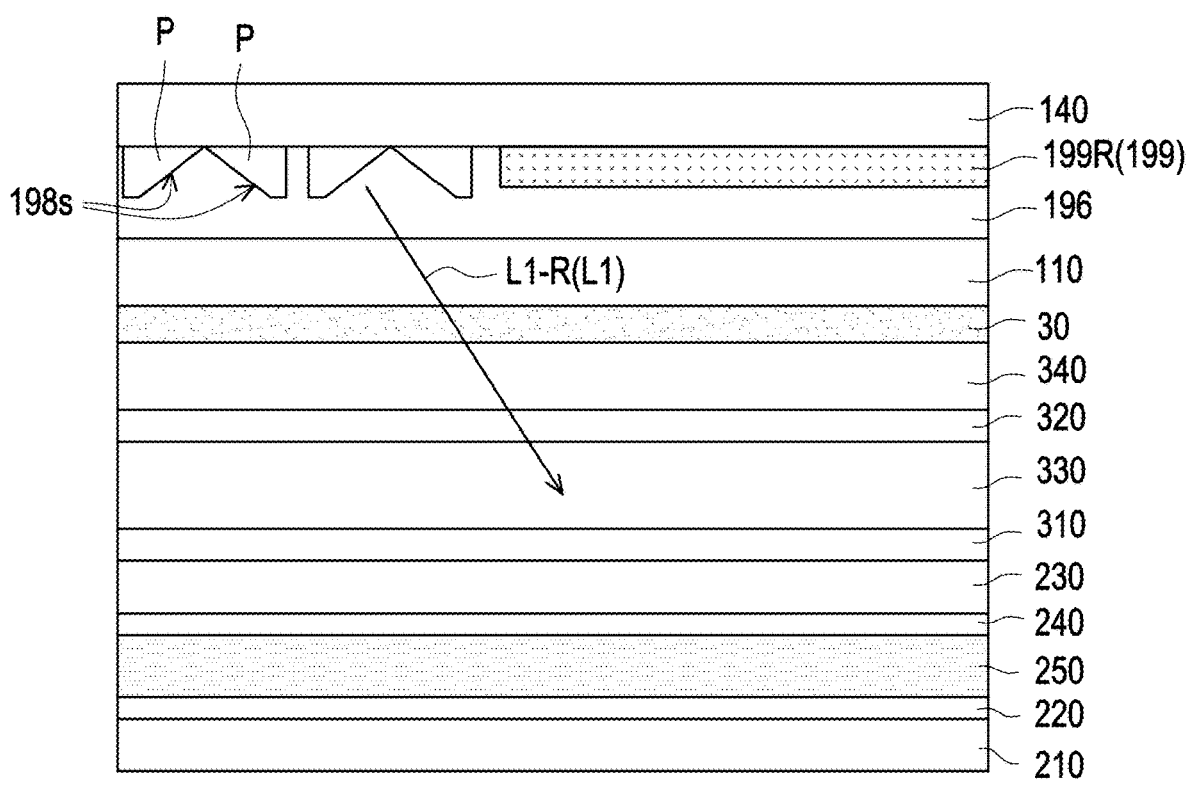
FIG. 18 is a partially enlarged schematic diagram of the transparent display apparatus in FIG. 16.

FIG. 16 is a schematic cross-sectional view of a transparent display apparatus according to another embodiment of the present disclosure. FIG. 17 is a partially enlarged schematic diagram of the transparent display apparatus of FIG. 16. The cholesterol liquid crystal layer 330 of the transparent display apparatus 10F in FIG. 17 is in a planer type. FIG. 18 is a partially enlarged schematic diagram of the transparent display apparatus in FIG. 16. The cholesterol liquid crystal layer 330 of the transparent display apparatus 10F in FIG. 18 is in a focal conic type.

The transparent display apparatus 10F in FIG. 16 is similar to the transparent display apparatus 10D in FIG. 12. The main difference between the two transparent display apparatus is that the transparent display apparatus 10F in FIG. 16 further includes a cholesterol liquid crystal layer 330; the transparent display panel DP1 of the first transparent display apparatus 10F in FIG. 16 further includes a photoluminescent pattern 199 and a light recycling structure 198.

Referring to FIG. 16, in this embodiment, the transparent display apparatus 10F further includes a cholesterol liquid crystal layer 330 disposed between the first transparent display panel DP1 and the light modulation panel 20. The transparent display apparatus 10F further includes a transparent substrate 340 disposed on the first optical adhesive layer 30 and the cholesterol liquid crystal layer 330. The transparent display apparatus 10F further includes a transparent electrode 320 disposed between the transparent substrate 340 and the cholesterol liquid crystal layer 330. The transparent display apparatus 10F further includes a transparent electrode 310 disposed between the second transparent substrate 230 of the light modulation panel 20 and the cholesterol liquid crystal layer 330. The voltage between the transparent electrode 320 and the transparent electrode 310 is used to control the state of the cholesterol liquid crystal layer 330. The cholesterol liquid crystal layer 330 includes a self-aligned cholesterol liquid crystal. The self-aligned cholesterol liquid crystal is essentially transparent rather than hazy when it is in a focal conic state.

In this embodiment, the first transparent display panel DP1 has a pixel area 114 and a light modulation area 116 next to the pixel area 114, the first transparent display panel DP1 includes a first transparent substrate 110, a second transparent substrate 140, at least one light emitting element 120 and at least one photoluminescent pattern 199, at least one light emitting element 120 is used to emit light beam L1, the first transparent substrate 110 of the first transparent display panel DP1 is closer to the cholesterol liquid crystal layer 330 than the second transparent substrate 140 of the first transparent display panel DP1, at least one light emitting element 120 is located in the pixel area. 114 and is disposed on the first transparent substrate 110 of the first transparent display panel DP1, at least one photoluminescent pattern 199 is located in the light modulation area 116 and is disposed on the second transparent substrate 140 of the first transparent display panel DPL.

In this embodiment, the first transparent display panel DP1 further includes a light recycling structure 198 disposed on the second transparent substrate 140 of the first transparent display panel DP1 and is located between at least one light emitting element 120 and at least one photoluminescent pattern 199. For example, in this embodiment, the light structure recycling 198 may include two micro-columns P with inclined surfaces 198s arranged opposite to each other, and an angle form between the inclined surfaces 198s of the two micro-coats P may be 90 degrees. However, this disclosure is not limited to this. In other embodiments, the light recycling structure 198 may be other forms of optical microstructures.

For example, in this embodiment, at least one light emitting element 120 located on the pixel area 114 of the first transparent substrate 110 may include a first light emitting element 120R, a second light emitting element 120G and a third light emitting element 120B for respectively emitting first color light L1-R, second color light L1-G and third color light L1-B. The light beam L1 emitted by at least one light emitting element 120 located in each of the pixel areas 114 includes the first color light L1-R, the second color light L1-G and the third color light L1-B. At least one photoluminescent pattern 199 located above the light modulation area 116 of the first transparent substrate 110 and formed on the second transparent substrate 140 includes a first photoluminescent pattern 199R, a second photoluminescent pattern 199G and a third photoluminescent pattern 199B. If the first photoluminescent pattern 199R receives the first color light L1-R with a certain light intensity or above, it can emit the same or similar color light; if the second photoluminescent pattern 199G receives the second color light L1-G with a certain light intensity or above, it can emit the same or similar color light; if the third photoluminescent pattern 199B receives the third color light L1-B with a certain light intensity or above, it can emit the same or similar color light. If the light intensity transmitted to the first photoluminescent pattern 199R, the second photoluminescent pattern 199G and the third photoluminescent pattern 199B is insufficient (for example: ambient light beam), the first photoluminescent pattern 199R, the second photoluminescent pattern 199G and the third photoluminescent pattern 199B cannot emit light, and the light beam will pass through the first photoluminescent pattern 199R, the second photoluminescent pattern 199G and the third photoluminescent pattern 199B, and the first photoluminescent pattern 199R, the second photoluminescent pattern 199G and the third photoluminescent pattern 199B are approximately transparent. In this embodiment, the first color light L1-R, the second color light L1-G and the third color light L1-B are, for example, red light, green light and blue light respectively.

Figure 19:
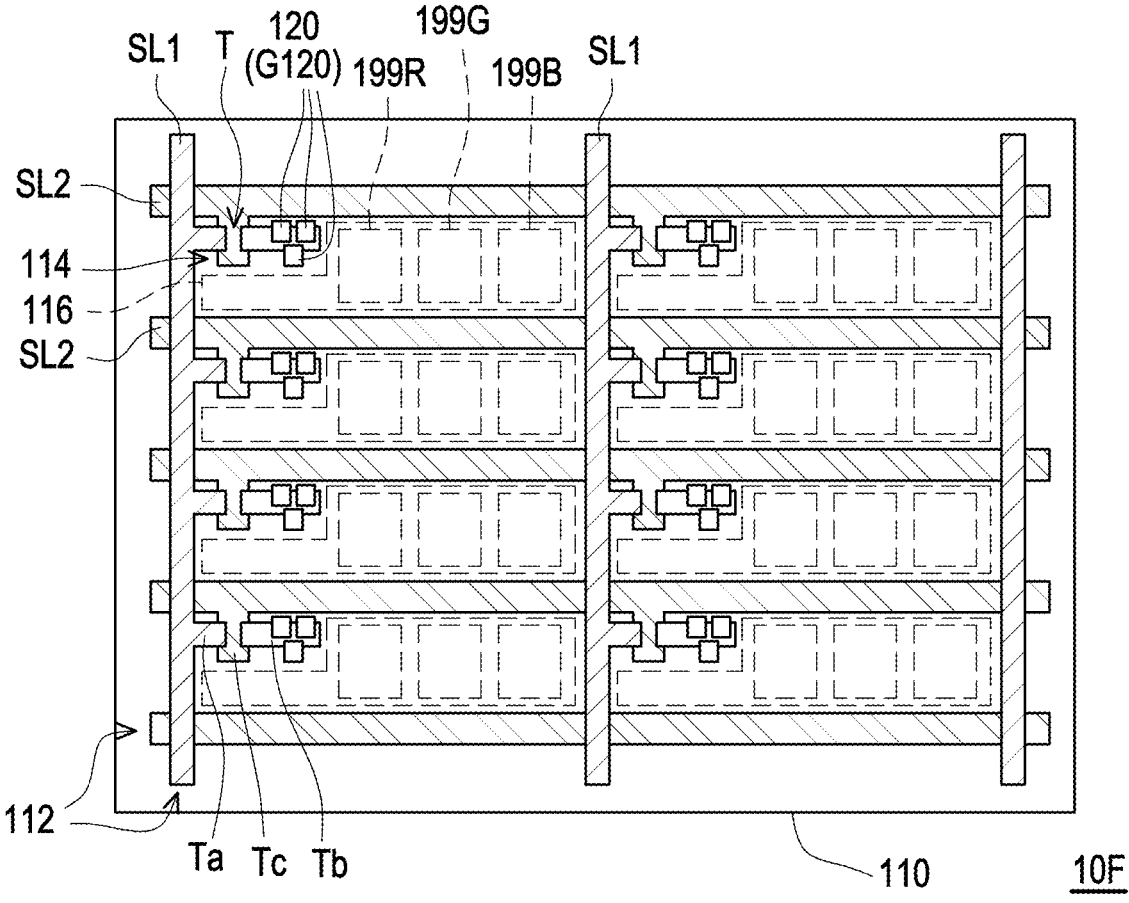
FIG. 19 is a schematic top view of a transparent display apparatus according to an embodiment of the present disclosure.
Figure 20:
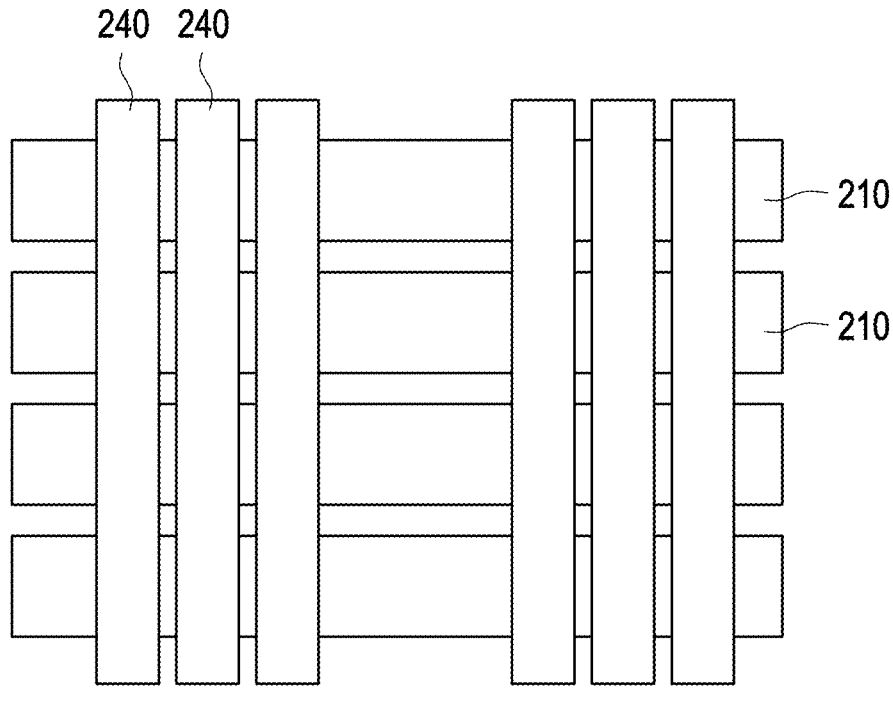
FIG. 20 is a schematic top view of the first electrode and the second electrode of the light modulation panel according to one embodiment of this disclosure.
Figure 21:
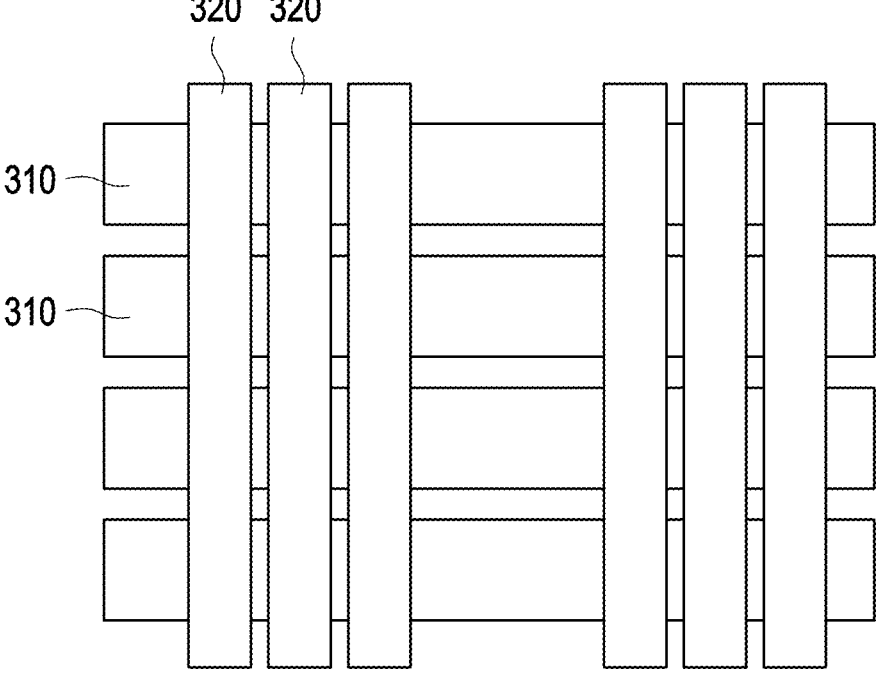
FIG. 21 is a schematic top view of the transparent electrode used to control the cholesterol liquid crystal layer according to one embodiment of the present disclosure.

FIG. 19 is a schematic top view of a transparent display apparatus according to an embodiment of the present disclosure. FIG. 19 shows the first transparent substrate 110, the first signal lines SL1, the second signal lines SL2, the pixel structures PX and photoluminescent pattern 199, while other components are omitted. FIG. 20 is a schematic top view of the first electrode and the second electrode of the light modulation panel according to one embodiment of this disclosure. FIG. 21 is a schematic top view of the transparent electrode used to control the cholesterol liquid crystal layer according to one embodiment of the present disclosure.

Referring to FIG. 16, FIG. 19, FIG. 20 and FIG. 21, in this embodiment, each of the first photoluminescent pattern 199R, the second photoluminescent pattern 199G and the third photoluminescent pattern 199B may overlap one of an intersection of a first electrode 220 and a second electrode 240 of the light modulation panel 120 and an intersection of a transparent electrode 310 and a transparent electrode 320 for controlling the cholesterol liquid crystal layer 330.

Referring to FIG. 16 and FIG. 17, the light beam L1 emitted by the light emitting element 120 may be guided to the cholesterol liquid crystal layer 330 by the light recycling structure 198, when the cholesterol liquid crystal layer 330 is in a planer state, the light beam L1 may be reflected by the cholesterol liquid crystal layer 330 toward the photoluminescent pattern 199 above the light modulation area 116, hereby causing light emit form both the pixel area 114 and the light modulation area 116. In this way, the brightness of the display image can be improved. For example, in this embodiment, the cholesterol liquid crystal layer 330 in a planer state has a total reflection spectrum. That is to say, the cholesterol liquid crystal layer 330 in a planer state can reflect the first color light L1-R, the second color light L1-G and the third color light L1-B, which are red light, green light and blue light respectively. The first color light L1-R, the second color light L1-G and the third color light L1-B reflected by the cholesterol liquid crystal layer 330 in a planer state can be transmitted to the first photoluminescent pattern 199R, the second photoluminescent pattern 199G and the third color light L1-B respectively, so that the first photoluminescent pattern 199R, the second photoluminescent pattern 199G and the third photoluminescent pattern 199B emit corresponding colored light, and light is emitted above the light modulation area 116. In addition, in this embodiment, when the cholesterol liquid crystal layer 330 is in a planar state, the electrochromic material 250 may be selectively in a dimming state to increase the contrast of the display image while using the cholesterol liquid crystal layer 330 to increase the brightness of the display image, but this disclosure is not limited to thereto.

Referring to FIGS. 16 and 18, a portion of the light beam L1 of the light emitting element 120 can be guided to the cholesterol liquid crystal layer 330 by the light recycling structure 198. When the cholesterol liquid crystal layer 330 is in a focal conic state, the light beam L1 can pass through the cholesterol liquid crystal layer 330 and transmit to the electrochromic material 250. The electrochromic material 250 in the dimming state can absorb a portion of the stray light beam L1 to reduce additional light leakage.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A transparent display apparatus comprising:
   a first transparent substrate having a circuit area, pixel areas and light modulation areas;
   first signal lines and second signal lines intersected with each other and disposed in the circuit area;
   pixel structures respectively disposed in the pixel areas and electrically connected to the first signal lines and the second signal lines, wherein each of the light modulation areas is surrounded by a part of the pixel structures;
   transparent insulation patterns disposed on the first transparent substrate and cover the pixel structures respectively;
   second transparent substrate disposed opposite the first transparent substrate;
   an electrochromic material, wherein the electrochromic material and the transparent insulation patterns are disposed between the first transparent substrate and the second transparent substrate; and
   first transparent electrodes and second transparent electrodes, disposed between the first transparent substrate and the second transparent substrate, wherein the first transparent electrodes and the second transparent electrodes intersect with each other on the light modulation areas;
   wherein the first transparent electrodes comprises a first light modulation electrode and a second light modulation electrode, the first light modulation electrode and the second light modulation electrode are located on the same side of the electrochromic material and structurally separated from each other, the first light modulation electrode is overlapped with one of the transparent insulation patterns, and the second light modulation electrode is overlapped with one of the light modulation areas.

2. The transparent display apparatus according to claim 1, wherein the first transparent electrodes disposed on the second transparent substrate;
wherein the second transparent electrodes disposed on the first transparent substrate.

3. The transparent display apparatus according to claim 1, wherein when the transparent display apparatus is in a special display mode, the pixel structures are turned on to provide light beams, the light beams pass through the transparent insulation patterns and the second transparent substrate to form a display image, there is a current between the first transparent electrodes and the second transparent electrodes, and at least one portion of the electrochromic material located in the light modulation areas is in a dimming state.

4. The transparent display apparatus according to claim 1, wherein when the transparent display apparatus is in a light shielding mode, the pixel structures are turned off, the first transparent electrodes and the second transparent electrodes have a potential difference, and at least one portion of the electrochromic material located in the light modulation areas is in a dimming state.

5. The transparent display apparatus according to claim 1, wherein
in a top view of the transparent display apparatus, a pixel structure of the pixel structures is located between two adjacent first signal lines of the first signal lines and between two adjacent second signal lines of the second signal lines, the first light modulation electrode and the second light modulation electrode are located between the two adjacent first signal lines, and the first light modulation electrode is closer to the pixel structure than the second light modulation electrode.

6. The transparent display apparatus according to claim 5, wherein the light modulation areas comprises a first light modulation area and a second light modulation area respectively overlapping the first light modulation electrode and the second light modulation electrode; when the transparent display apparatus is in a special transparent display mode, there is a current between the first light modulation electrode and one of the second transparent electrodes, a portion of the electrochromic material located in the first light modulation area is in a dimming state, there is substantially no current between the second light modulation electrode and the one of the second transparent electrodes, and a portion of the electrochromic material located in the second light modulation area is in a translucent state.

7. A transparent display apparatus comprising:
a first transparent display panel, comprising:
a first transparent substrate, comprising a first surface and a second surface facing away from the first surface;
a second transparent substrate; and
at least one light emitting element, disposed between the first transparent substrate of the first transparent display panel and the second transparent substrate of the first transparent display panel, wherein the at least one light emitting element is disposed on the first surface of the first transparent substrate of the first transparent display panel;
a light modulation panel, comprising:
a first transparent substrate;
a first electrode, disposed on the first transparent substrate of the light modulation panel;

a second transparent substrate, disposed opposite the first transparent substrate of the light modulation panel;
a second electrode, disposed on the second transparent substrate of the light modulation panel; and
an electrochromic material disposed between the first electrode and the second electrode; and
a first optical adhesive layer disposed between the light modulation panel and the second surface of the first transparent substrate of the first transparent display panel, wherein the first optical adhesive layer has dye molecules.

8. The transparent display apparatus according to claim 7, wherein the dye molecules comprises blue dye molecules.

9. The transparent display apparatus according to claim 7, further comprising:
a second transparent display panel, wherein the light modulation panel is disposed between the first transparent display panel and the second transparent display panel; and
a second optical adhesive layer disposed between the light modulation panel and the second transparent display panel, wherein the second optical adhesive layer has dye molecules.

10. The transparent display apparatus according to claim 7, further comprising:
a second transparent display panel, wherein the light modulation panel is disposed between the first transparent display panel and the second transparent display panel;
the first electrode of the light modulation panel has a first light-shielding conductive portion overlapping a light emitting element of the first transparent display panel and a light emitting element of the second transparent display panel.

11. The transparent display apparatus according to claim 10, wherein the second electrode of the light modulation panel has a second light-shielding conductive portion overlapping the light emitting element of the first transparent display panel and the light emitting element of the second transparent display panel.

12. The transparent display apparatus according to claim 7, further comprising:
a cholesterol liquid crystal layer, disposed between the first transparent display panel and the light modulation panel.

13. The transparent display apparatus according to claim 12, wherein the first transparent display panel has a pixel area and a light modulation area next to the pixel area, the first transparent display panel comprises at least one photoluminescent pattern, the first transparent substrate of the first transparent display panel is closer to the cholesterol liquid crystal layer than the second transparent substrate of the first transparent display panel, the at least one light emitting element is located in the pixel area and is disposed on the first transparent substrate of the first transparent display panel, and the at least one photoluminescent pattern is located in the light modulation area and is disposed on the second transparent substrate of the first transparent display panel.

14. The transparent display apparatus according to claim 13, wherein the first transparent display panel further comprises a light recycling structure, disposed on the second transparent substrate of the first transparent display panel and is located between the at least one light emitting element and the at least one photoluminescent pattern.

15. A transparent display apparatus comprising:

a first transparent display panel;

a light modulation panel, comprising:

a first transparent substrate;

a first electrode, disposed on the first transparent substrate, wherein the first electrode has a first light-transmitting conductive portion and a first light-shielding conductive portion;

a second transparent substrate, disposed opposite the first transparent substrate;

a second electrode, disposed on the second transparent substrate; and an electrochromic material disposed between the first electrode and the second electrode; and a second transparent display panel, wherein the light modulation panel is disposed between the first transparent display panel and the second transparent display panel;

wherein the first light-shielding conductive portion overlaps a light emitting element of the first transparent display panel and a light emitting element of the second transparent display panel, and the first light-transmitting conductive portion overlaps a light modulation area surrounded by the light emitting element of the first transparent display panel and the light emitting element of the second transparent display panel.

16. The transparent display apparatus according to claim 15, wherein the second electrode of the light modulation panel has a second light-shielding conductive portion, and the second light-shielding conductive portion overlaps the light emitting element of the first transparent display panel and the light emitting element of the second transparent display panel.

17. A transparent display apparatus comprising:

a first transparent display panel;

a light modulation panel, comprising:

a first transparent substrate;

a first electrode, disposed on the first transparent substrate;

a second transparent substrate, disposed opposite the first transparent substrate;

a second electrode, disposed on the second transparent substrate; and an electrochromic material disposed between the first electrode and the second electrode; and a cholesterol liquid crystal layer, disposed between the first transparent display panel and the light modulation panel, wherein the light modulation panel, the cholesterol liquid crystal layer and the first transparent display panel are arranged sequentially;

the first transparent display panel has a pixel area and a light modulation area next to the pixel area, the first transparent display panel comprises a first transparent substrate, a second transparent substrate, at least one light emitting element and at least one photoluminescent pattern, the first transparent substrate of the first transparent display panel is closer to the cholesterol liquid crystal layer than the second transparent substrate of the first transparent display panel, the at least one light emitting element is located in the pixel area and is disposed on the first transparent substrate of the first transparent display panel, and the at least one photoluminescent pattern is located in the light modulation area and is disposed on the second transparent substrate of the first transparent display panel.

18. The transparent display apparatus according to claim 17, wherein the first transparent display panel further comprises a light recycling structure disposed on the second transparent substrate of the first transparent display panel and is located between the at least one light emitting element and the at least one photoluminescent pattern.

19. The transparent display apparatus according to claim 1, wherein a transparent insulation pattern of the transparent insulation patterns has a top surface, a bottom surface and a side wall, the top surface is parallel to the first transparent substrate, the bottom surface is disposed opposite to the top surface, the side wall is connected between the top surface and the bottom surface, and the side wall of the transparent insulation pattern is in contact with the electrochromic material.

* * * * *